(12) United States Patent
Brauer

(10) Patent No.: US 10,614,329 B2
(45) Date of Patent: *Apr. 7, 2020

(54) APPARATUS AND METHOD FOR PROVIDING ATTITUDE REFERENCE FOR VEHICLE PASSENGERS

(71) Applicant: B/E Aerospace, Inc., Winston Salem, NC (US)

(72) Inventor: R. Klaus Brauer, Seattle, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/369,705

(22) Filed: Mar. 29, 2019

(65) Prior Publication Data

US 2019/0228244 A1   Jul. 25, 2019

Related U.S. Application Data

(63) Continuation-in-part of application No. 15/993,310, filed on May 30, 2018, now Pat. No. 10,452,934,
(Continued)

(51) Int. Cl.
*G06K 9/00* (2006.01)
*H04N 7/18* (2006.01)
(Continued)

(52) U.S. Cl.
CPC ...... *G06K 9/00845* (2013.01); *B64D 11/0015* (2013.01); *G02B 1/11* (2013.01); *G02B 27/01* (2013.01); *G06F 3/005* (2013.01); *G06F 3/013* (2013.01); *G06F 3/1446* (2013.01);
*G06K 9/00604* (2013.01); *G06K 9/00791* (2013.01); *H04N 5/2253* (2013.01); *H04N 5/23219* (2013.01); *H04N 5/23293* (2013.01);
(Continued)

(58) Field of Classification Search
None
See application file for complete search history.

(56) References Cited

U.S. PATENT DOCUMENTS 5,568,960 A   10/1996   Oleson et al.
5,611,503 A    3/1997   Brauer
(Continued)

FOREIGN PATENT DOCUMENTS

CA   2866844 A1    9/2013
CA   2909429 A1   12/2014
(Continued)

OTHER PUBLICATIONS

Office Action dated Oct. 31, 2018 for Chinese Patent Application No. 201580042425.1.
(Continued)

*Primary Examiner* — Rebecca A Volentine
(74) *Attorney, Agent, or Firm* — Suiter Swantz pc llo

(57) ABSTRACT

A system and method. The system may include a monitor implemented as a virtual window, two cameras, and a switch. The switch may be configured to: when a passenger is in a first position, feed video from a first camera to the monitor; and when the passenger is in a second position, feed video from the second camera to the monitor.

19 Claims, 25 Drawing Sheets

Related U.S. Application Data which is a continuation of application No. 15/382,633, filed on Dec. 17, 2016, now Pat. No. 10,089,544, which is a continuation of application No. 14/645,526, filed on Mar. 12, 2015, now Pat. No. 9,996,754, and application No. 15/993,310, May 30, 2018, and a continuation-in-part of application No. 14/645,526, filed on Mar. 12, 2015, now Pat. No. 9,996,754, and application No. 16/369,705, which is a continuation of application No. 16/241,653, filed on Jan. 7, 2019, which is a continuation of application No. 15/993,310, filed on May 30, 2018, now Pat. No. 10,452,934, which is a continuation of application No. 15/382,633, filed on Dec. 17, 2016, now Pat. No. 10,089,544, which is a continuation-in-part of application No. 14/645,526, filed on Mar. 12, 2015, now Pat. No. 9,996,754, and application No. 16/369,705, which is a continuation-in-part of application No. 16/241,953, filed on Jan. 7, 2019, which is a continuation of application No. 15/993,310, filed on May 30, 2018, now Pat. No. 10,452,934, which is a continuation-in-part of application No. 14/645,526, filed on Mar. 12, 2015, now Pat. No. 9,996,754.

(60) Provisional application No. 62/011,866, filed on Jun. 13, 2014.

(51) Int. Cl.

| | |
|---|---|
| *G06F 3/01* | (2006.01) |
| *H04N 5/232* | (2006.01) |
| *G02B 1/11* | (2015.01) |
| *G06F 3/00* | (2006.01) |
| *G06F 3/14* | (2006.01) |
| *H04N 5/225* | (2006.01) |
| *B64D 11/00* | (2006.01) |
| *G02B 27/01* | (2006.01) |
| *G02B 27/00* | (2006.01) |

(52) U.S. Cl.
CPC ......... *H04N 5/23296* (2013.01); *H04N 7/181* (2013.01); *B64D 2011/0061* (2013.01); *G02B 27/0006* (2013.01); *G02B 2027/0138* (2013.01)

(56) References Cited

U.S. PATENT DOCUMENTS

| | | | |
|---|---|---|---|
| 6,317,127 B1 | 11/2001 | Daily et al. | |
| 7,088,310 B2 | 8/2006 | Sanford | |
| 7,128,705 B2 | 10/2006 | Brendley et al. | |
| 7,280,134 B1 | 10/2007 | Henderson et al. | |
| 8,590,838 B2 | 11/2013 | Cook et al. | |
| 8,932,905 B1 | 1/2015 | Safai | |
| 9,187,178 B2 | 11/2015 | Round et al. | |
| 9,193,465 B2 | 11/2015 | Udriste | |
| 9,456,184 B2 | 9/2016 | Barrou et al. | |
| 9,706,242 B2 | 7/2017 | Dame et al. | |
| 9,787,948 B2 | 10/2017 | de Carvalho et al. | |
| 9,864,559 B2 | 1/2018 | Sizelove | |
| 9,996,754 B2 | 6/2018 | Brauer | |
| 10,089,544 B2 | 10/2018 | Brauer | |
| 10,118,545 B2 | 11/2018 | Garing et al. | |
| 2002/0093564 A1 | 7/2002 | Israel | |
| 2004/0217234 A1 | 11/2004 | Jones et al. | |
| 2004/0217978 A1 | 11/2004 | Humphries | |
| 2005/0099433 A1 | 5/2005 | Berson et al. | |
| 2005/0211841 A1 | 9/2005 | Guard et al. | |
| 2005/0278753 A1 | 12/2005 | Brady, Jr. et al. | |
| 2008/0111832 A1 | 5/2008 | Emam et al. | |
| 2008/0136839 A1 | 6/2008 | Franko et al. | |
| 2009/0195652 A1* | 8/2009 | Gal | B60R 1/00 348/148 |
| 2010/0060739 A1 | 3/2010 | Salazar | |
| 2010/0073483 A1* | 3/2010 | Squillante | H04N 7/108 348/159 |
| 2010/0157063 A1 | 6/2010 | Basso et al. | |
| 2010/0188506 A1 | 7/2010 | Dwyer et al. | |
| 2012/0325962 A1 | 12/2012 | Barron | |
| 2013/0073775 A1* | 3/2013 | Wade | G06F 13/4022 710/316 |
| 2013/0169807 A1 | 7/2013 | de Carvalho et al. | |
| 2013/0248654 A1 | 9/2013 | Henshaw et al. | |
| 2013/0248655 A1 | 9/2013 | Kroll et al. | |
| 2013/0286290 A1* | 10/2013 | Tang | G09G 5/006 348/705 |
| 2014/0160285 A1 | 6/2014 | Barrou et al. | |
| 2014/0173669 A1 | 6/2014 | Coto-Lopez | |
| 2014/0248827 A1 | 9/2014 | Keleher et al. | |
| 2015/0077337 A1 | 3/2015 | Coto-Lopez | |
| 2015/0138449 A1 | 5/2015 | Rawlinson et al. | |
| 2015/0363656 A1 | 12/2015 | Brauer | |
| 2016/0325836 A1 | 11/2016 | Teo | |
| 2017/0057660 A1 | 3/2017 | Badger et al. | |
| 2017/0088267 A1 | 3/2017 | Dowty et al. | |
| 2017/0094166 A1 | 3/2017 | Riedel | |
| 2017/0098133 A1 | 4/2017 | Brauer | |
| 2017/0240283 A1 | 8/2017 | Dowty | |
| 2017/0259921 A1 | 9/2017 | Valdes De La Garza et al. | |

FOREIGN PATENT DOCUMENTS

| | | |
|---|---|---|
| CN | 102156607 A | 8/2011 |
| EP | 0838787 A2 | 4/1998 |
| EP | 0913325 A1 | 5/1999 |
| EP | 2825458 A1 | 1/2015 |
| EP | 3141480 A1 | 3/2017 |
| EP | 3148186 A1 | 3/2017 |
| WO | 2004096640 A1 | 11/2004 |
| WO | 2016018731 A1 | 2/2016 |
| WO | 2017176811 A1 | 10/2017 |

OTHER PUBLICATIONS

International Search Report and Written Opinion dated May 21, 2015 for PCT/US2015/020075.

\* cited by examiner

AFT IMAGE

CENTER IMAGE

FORWARD IMAGE

AFT IMAGE

CENTER IMAGE

FORWARD IMAGE

APPARATUS AND METHOD FOR PROVIDING ATTITUDE REFERENCE FOR VEHICLE PASSENGERS

CROSS-REFERENCE TO RELATED APPLICATIONS

This application claims priority to:

1) U.S. application Ser. No. 15/993,310 entitled "Apparatus and Method for Providing Attitude Reference for Vehicle Passengers" and filed May 30, 2018, which claims priority to:
   a) U.S. application Ser. No. 15/382,633 entitled "Apparatus and Method for Providing Attitude Reference for Vehicle Passengers" and filed Dec. 17, 2016 and issued as U.S. Pat. No. 10,089,544, which claims priority to U.S. application Ser. No. 14/645,526 entitled "Apparatus and Method for Providing Attitude Reference for Vehicle Passengers" and filed Mar. 12, 2015 and issued as U.S. Pat. No. 9,996,754, which claims priority to U.S. Provisional Application No. 62/011,866 filed on Jun. 13, 2014; and
   b) U.S. application Ser. No. 14/645,526 entitled "Apparatus and Method for Providing Attitude Reference for Vehicle Passengers" and filed Mar. 12, 2015 and issued as U.S. Pat. No. 9,996,754, which claims priority to U.S. Provisional Application No. 62/011,866 filed on Jun. 13, 2014; and 2) U.S. application Ser. No. 16/241,653 entitled "Apparatus and Method for Providing Attitude Reference for Vehicle Passengers" and filed Jan. 7, 2019, which claims priority to U.S. application Ser. No. 15/993,310 entitled "Apparatus and Method for Providing Attitude Reference for Vehicle Passengers" and filed May 30, 2018, which claims priority to:
   a) U.S. application Ser. No. 15/382,633 entitled "Apparatus and Method for Providing Attitude Reference for Vehicle Passengers" and filed Dec. 17, 2016 and issued as U.S. Pat. No. 10,089,544, which claims priority to U.S. application Ser. No. 14/645,526 entitled "Apparatus and Method for Providing Attitude Reference for Vehicle Passengers" and filed Mar. 12, 2015 and issued as U.S. Pat. No. 9,996,754, which claims priority to U.S. Provisional Application No. 62/011,866 filed on Jun. 13, 2014; and
   b) U.S. application Ser. No. 14/645,526 entitled "Apparatus and Method for Providing Attitude Reference for Vehicle Passengers" and filed Mar. 12, 2015 and issued as U.S. Pat. No. 9,996,754, which claims priority to U.S. Provisional Application No. 62/011,866 filed on Jun. 13, 2014;

the contents of each of which are herein incorporated by reference in their entirety.

BACKGROUND

The present disclosure relates generally to the field of vehicular travel and more particularly to a video system which informs one or more passengers seated in an enclosed windowless suite in a vehicle of the vehicle's attitude and changes in vehicle attitude (e.g. pitching nose up or nose down, or yawing or rolling to the right or left). Such windowless suites are now found in luxury long haul aircraft cabin suites of commercial aircraft.

It has long been known that airline passengers seated in window seats report experiencing higher comfort levels than passengers in other cabin areas. See U.S. Pat. No. 5,611,503, particularly FIG. 4. While there may be several reasons for this higher reported comfort level, psychological studies have shown that enabling passengers to be correctly oriented in space is an important contributor to passenger comfort. While some passengers experience acute motion sickness when deprived of visual references informing them of changes in vehicle attitude, a majority of airline passengers experience only a somewhat diminished comfort, the origin of which is unknown to them, when experiencing properly-coordinated maneuvers of a commercial airplane without a visual reference informing them of changes in airplane attitude.

Forward looking and downward looking "landscape" cameras displaying images on a video screen generally forward of the passenger are well known. Static airplane mockups incorporating video screens in lieu of actual windows are also known. In this and similar known applications, a single image has been replicated on all screens on the same side of the mockup.

Forward looking landscape cameras do not provide a reliable attitude reference during takeoff maneuvers because the nose of the aircraft is quickly pointed skyward, leaving no observable horizon. As a result, the disappearance of the horizon as the airplane rotates on takeoff can be disorienting to passengers. Downward looking cameras also do not provide an intuitive attitude reference to the passengers. Furthermore, the video screen displaying these images serves a variety of information and entertainment purposes and is rarely turned to the camera mode, rendering it unlikely to relieve motion-oriented discomfort resulting from a cause unrecognized by the passenger.

While they have been used in static mockups in which motion oriented discomfort is not an issue, emulating a row of aircraft windows with video monitors has never been considered sufficiently attractive for use in an airplane to justify developing and flight testing such a system. For a typical airplane cabin with many occupants and many monitors emulating actual windows, no viable alternative has been found to repeating the same image on each monitor down the length of a side of the cabin. When an airplane is climbing, repeating the same image in each monitor along a row of windows presents the image of a level flight over a sawtooth landscape. Any such perceived attitude reference is ambiguous or confusing. When an airplane is rolling, monitors farther from the passenger subtend a smaller vertical field of view. Accordingly, to each individual passenger the rear of the airplane will appear to be rolling more quickly than the front of the airplane; an appearance more likely to induce motion sickness than alleviate it.

Image latency presents the hazard of causing motion sickness when the feeling of motion provided by the passenger's sense of equilibrium is out of sync with the motion seen in virtual windows—as when their vestibular system senses an aircraft maneuver while their visual system still senses level flight (and vice versa).

SUMMARY

In one aspect, embodiments of the inventive concepts disclosed herein are directed to a system. The system may include a monitor, two cameras including a first camera and a second camera, and a switch. The monitor may be implemented as a virtual window. The monitor may be configured to display a given view outside of a vehicle, the view corresponding to a field of view of a passenger looking at the monitor as if the monitor were a real vehicle window. Each of the two cameras may be configured to capture video of the view outside of the vehicle, the given view corresponding to the field of view of the passenger looking at the monitor as if the monitor were the real vehicle window. The switch may be configured to: when the passenger is in a first position, feed video from the first camera to the monitor; and when the passenger is in a second position, feed video from the second camera to the monitor.

In a further aspect, embodiments of the inventive concepts disclosed herein are directed to an aircraft system. The aircraft system may include a monitor, two cameras including a first camera and a second camera, and a switch. The monitor may be implemented as a virtual window. The monitor may be configured to display a given view outside of an aircraft, the view corresponding to a field of view of a passenger looking at the monitor as if the monitor were a real aircraft window. Each of the two cameras may be configured to capture video of the view outside of the aircraft, the given view corresponding to the field of view of the passenger looking at the monitor as if the monitor were the real aircraft window. The switch may be configured to: when the passenger is in a first position, feed video from the first camera to the monitor; and when the passenger is in a second position, feed video from the second camera to the monitor.

In a further aspect, embodiments of the inventive concepts disclosed herein are directed to a method. The method may include when a passenger is in a first position, feeding, by a switch, video from a first camera to a monitor. The method may include when the passenger is in a second position, feeding, by the switch, video from a second camera to the monitor. The monitor may be implemented as a virtual window. The monitor may be configured to display a given view outside of a vehicle, each view corresponding to a field of view of the passenger looking at the monitor as if the monitor were a real vehicle window. Two cameras may include the first camera and the second camera. Each of the two cameras may be configured to capture video of the given view outside of the vehicle, the given view corresponding to the field of view of the passenger looking at the monitor as if the monitor were the real vehicle window.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
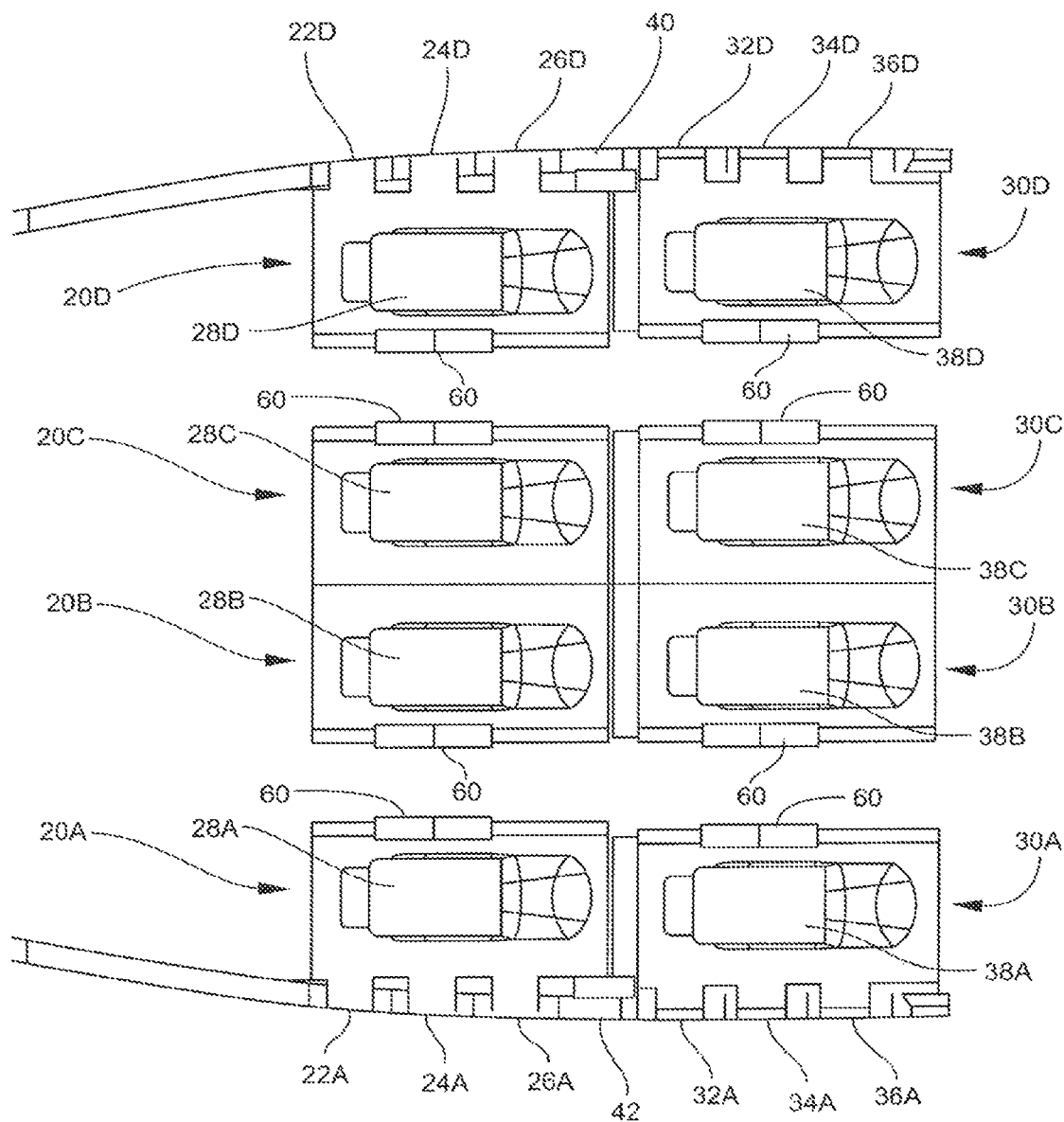
FIG. 1 is a plan view of a prior art aircraft interior having enclosed suites without access to direct visual attitude reference.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

The present disclosure provides a video system for emulating a set of actual windows to a passenger in an enclosed suite, compartment or cabin in an aircraft, ship or other vehicle, where motion can induce motion sickness or motion-related discomfort. The video system can include a video capture assembly configured to capture images of one or more perspective views as can be seen from a traditional airplane window or ship portal and one or more monitors for displaying the captured perspective view. The video system is configured to emulate a set of actual windows typically found in commercial aircraft in which passengers seated in enclosed suites or cabins can be expected to have experienced on previous flights. There is no need for passengers to focus their attention on the monitors of the video system to be provided the desired attitude reference. It is sufficient that they are subconsciously informed of changing airplane attitude through their peripheral vision.

A video system, as discussed herein, includes at least one video capture device (e.g., video camera) having a lens and an image sensor. The video capture device may have a certain aspect ratio, such as a 2:3, 4:3, or 16:9 aspect ratio. The image sensor can include, in some examples, a CCD (Charge Coupled Device) image sensor or a CMOS (Complementary Metal Oxide Semiconductor) image sensor. The image signals captured by the image sensor may be processed by an imaging signal processing unit which generates image data. The image signal processing unit can include processing circuitry for converting the image signals to digital data format. Additionally, the image signal processing unit may be configured to perform data sampling, image resolution adjustment, gain control, image balancing, gamma correction, and other image adjustment techniques. The video system may include at least one high speed data line interface and processing unit for transmitting the image data over a high speed data communications protocol. In some examples, the high speed data line interface can include a High-Definition Multimedia Interface (HDMI) data port, a High-Definition Serial Data Interface (HD-SDI) data port, or a Third Generation Serial Data Interface (3G-SDI) data port. The high speed data line interface may be wired or wireless. The image data may be communicated to the remote monitors via the at least one high speed data line interface. Alternatively or additionally, the video system may include a network interface for transmitting the data over a communications network, such as a local area network on the aircraft. The network interface may include a wired (e.g., Ethernet) or wireless connection. Further, the video system may include compression circuitry for compressing a size of the image data prior to transmission to the remote monitors.

The video system may further include a computer, computing system or processing circuitry having a controller configured to process the captured images and control display of the processed images on one or more monitors. In an example, the processing of the captured images can be based on mathematical guidance using the orientation and field of view for each image shown. In an embodiment, the displaying of the processed images can be distributed among multiple monitors based on the processing of the captured images.

Referring now to the drawings, FIG. 1 illustrates a prior art aircraft cabin with enclosed suites 20A-20D, 30A-30D. Each of the enclosed suites is accessible via a door 60. Note the blocked windows 40, 42. Passengers in suites 20A, 20D, 30A, and 30D have direct window access via windows 22A, 24A, 26A, 22D, 24D, 26D, 32A, 34A, 36A, 32D, 34D, and 36D, respectively. However, in this interior environment of FIG. 1, the passengers in enclosed suites 20B, 20C, 30B and 30C are without any visual attitude reference.

Figure 3:
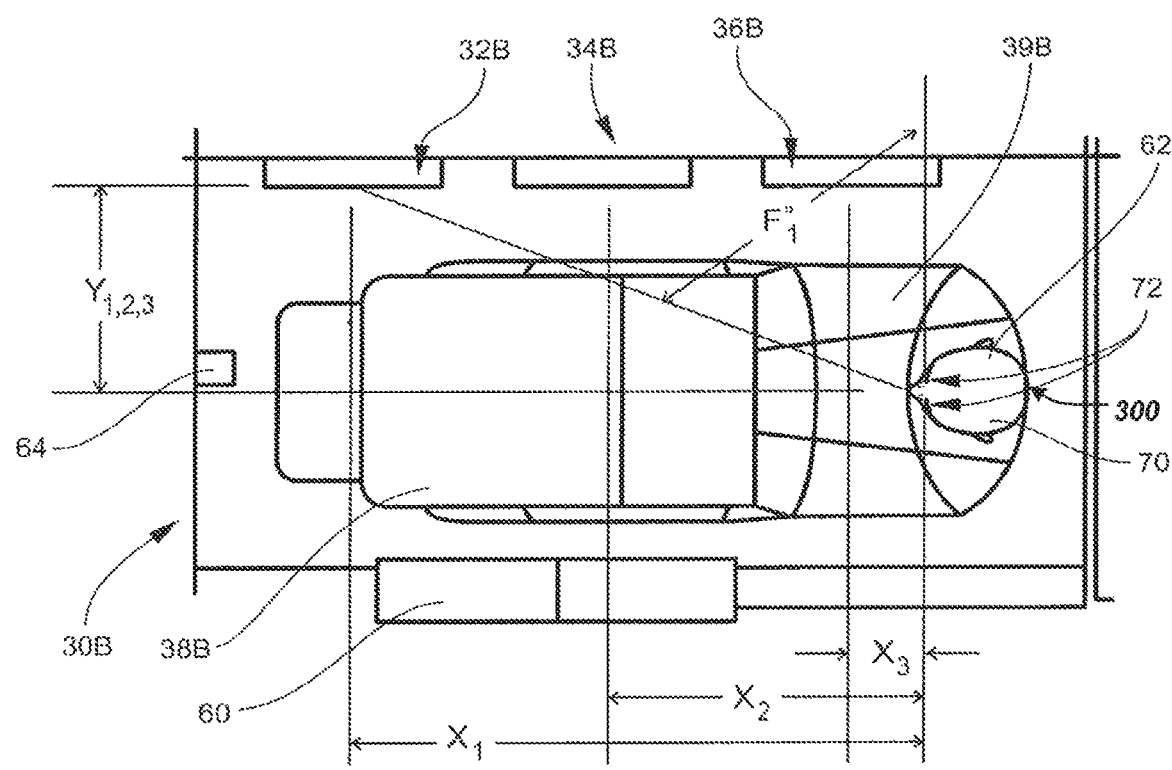
FIG. 3 is an enlarged plan view of an enclosed suite including the video system for providing attitude reference information to a seated aircraft passenger according to an example.
Figure 4:
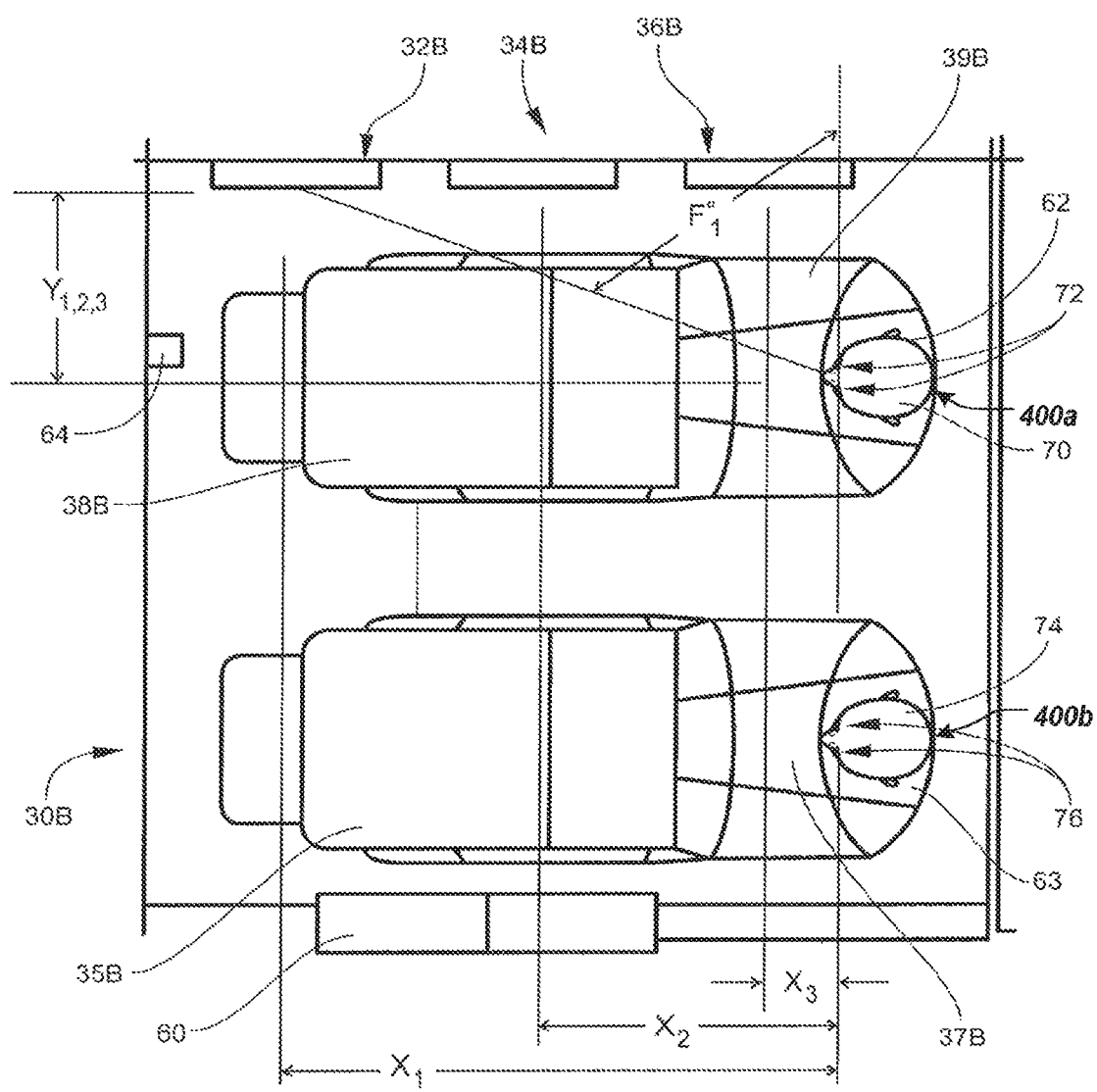
FIG. 4 is an enlarged plan view of an enclosed suite including the video system for providing attitude reference information to a pair of seated aircraft passengers according to an example.
Figure 5:
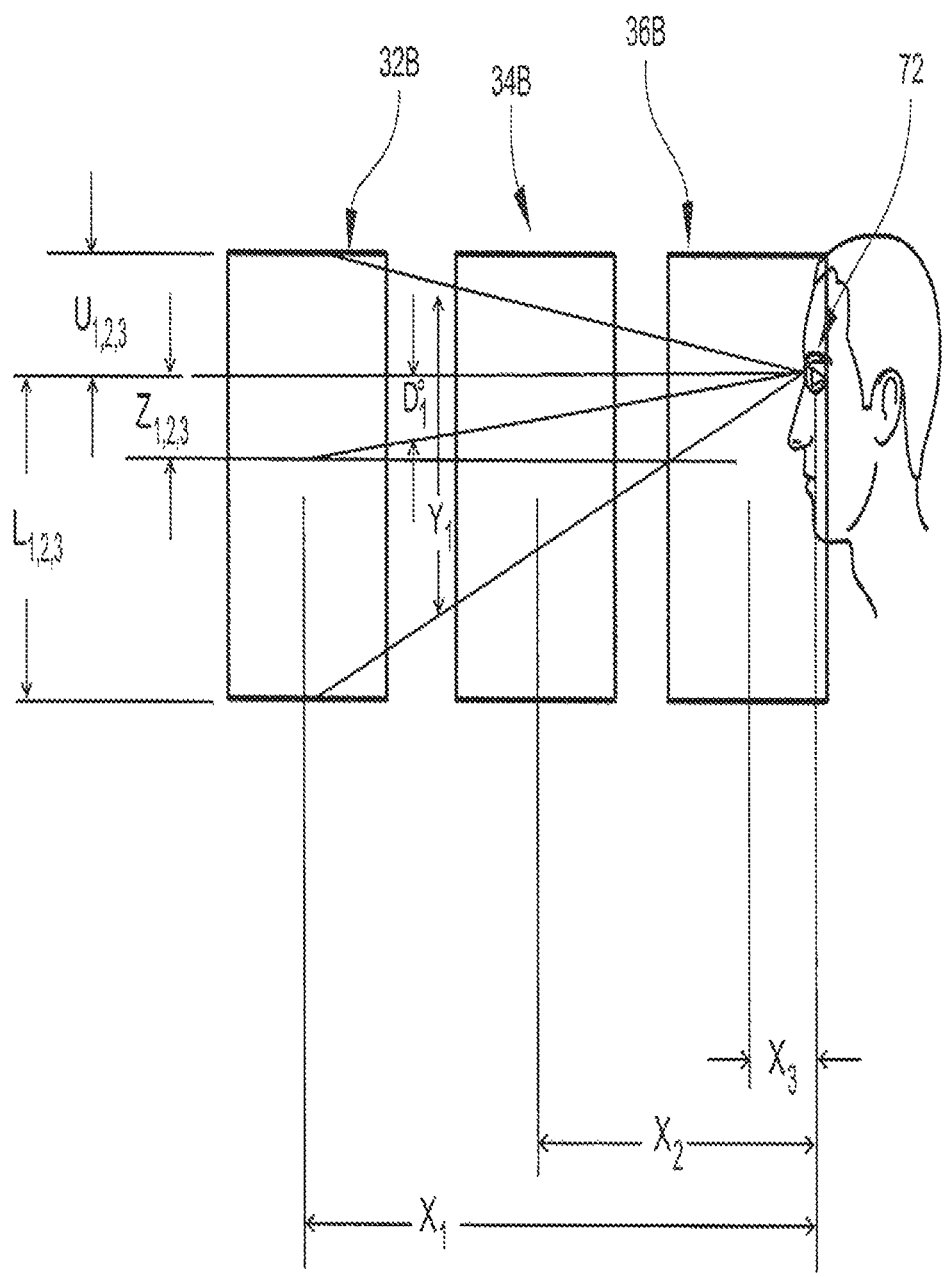
FIG. 5 is a side elevation view showing a set of monitors of the video system positioned along a wall of an enclosed suite and a set of eye elevation positions to each respective monitor according to an example.
Figure 6:
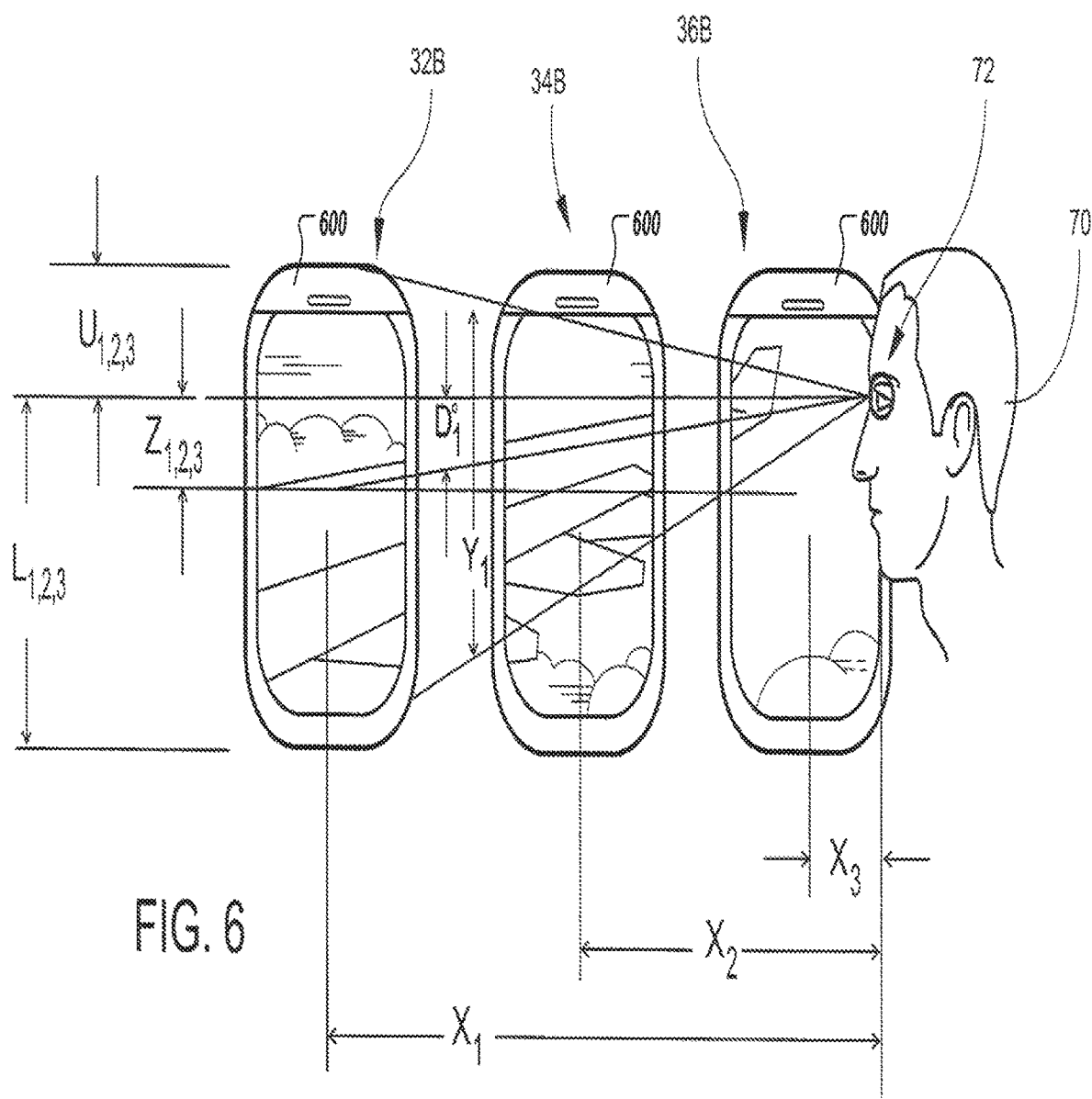
FIG. 6 is a side elevation view showing a set of virtual views displayed on each respective monitor based on the positioning of the set of monitors and the set of eye elevation positions according to an example.

In some implementations, as shown in FIGS. 2, 3, 4, 5, and 6, a video system 10 can include monitors 22B, 24B, 26B, 22C, 24C, 26C, 32B, 34B, 36B, 32C, 34C, and 36C, as indicated, for passengers seated in enclosed suites 20B, 20C, 30B, and 30C, respectively. As shown in FIGS. 5 and 6, orientations of the monitors emulate orientations of standard aircraft passenger windows. At least one monitor is adapted to serve as a virtual window mounted on the at least one interior partition in a substantially vertical and substantially parallel direction relative to a direction of forward travel of the vehicle in viewing proximity to the occupant. In an aspect, a monitor orientation takes advantage of a viewer's or passenger's 70 experience with "real" windows, such as real windows 22A, 24A, 26A, 32A, 34A, 36A, 22D, 24D, 26D, 32D, 34D, and 36D, to provide an intuitive attitude reference. Replication of this experience is depicted in FIG. 6. The monitors, 22B, 24B, 26B, 22C, 24C, 26C, 32B, 34B, 36B, 32C, 34C, and 36C, for example, may be provided to serve the single purpose of providing an external view (as shown in FIG. 6) and attitude reference. For example, to improve sense of well-being during flight it may be desirable to maintain the external view rather than using the monitors to provide informational or entertainment content. In another example, the monitors 22B, 24B, 26B, 22C, 24C, 26C, 32B, 34B, 36B, 32C, 34C, and 36C may remain on exterior view for taxi, take off, and landing modes of operation, but once the aircraft has settled into cruising position the monitor output of one or more of the monitors 22B, 24B, 26B, 22C, 24C, 26C, 32B, 34B, 36B, 32C, 34C, and 36C may be overridden by the passenger. Further to this example, in the event of turbulence of a severity causing seating of cabin attendants or discontinuance of beverage service, the monitor output may be overridden by an external system to return to the external view mode to ensure passenger comfort.

While the disclosure relates to one or more monitors 22B, 24B, 26B, 22C, 24C, 26C, 32B, 34B, 36B, 32C, 34C, and 36C, it may be appreciated that each monitor may be mounted behind a panel or frame such that a portion of the monitor is visible to the passenger. For example, one or more standard video monitors may be set behind a panel including one or more opening of approximately the size and shape of a passenger window on the exterior of the aircraft, such that the passenger views a portion of the video displayed to the monitor. The monitor, for example, may be centered behind the panel opening. The opening, for example, may be curved inwards towards the monitor as the interior cabin panel curves inwards toward each window. The panel may be designed to mimic the look and feel of the aircraft cabin walls. In other examples, the panel may be fabric, metal, or another decorative material.

To further mimic the look and feel of an exterior window, in some embodiments, each monitor 22B, 24B, 26B, 22C, 24C, 26C, 32B, 34B, 36B, 32C, 34C, and 36C includes a shade 600 for partially obscuring the view. In some embodiments, the shade is a virtual shade applied to the video feed presented upon the monitor. For example, the passenger may actuate a shade deployment control upon or remote from the monitor to set the position of a shade. In other embodiments, the shade is a physical shade, similar to the shades mounted upon the exterior windows and manually slidable to set a vertical height of shade deployment.

To provide high resolution images to each monitor, 22B, 24B, 26B, 22C, 24C, 26C, 32B, 34B, 36B, 32C, 34C, 36C, a preferred embodiment employs a video capture assembly 700 including one or more cameras located at camera position 50, 52, for each viewing angle. These cameras are positioned 50, 52 in unblocked windows 44, 46 respectively. (These windows are blocked in prior art—see FIG. 1). In cabin layouts including suite designs which naturally block one or more exterior windows on either side of the aircraft, in another example, the cameras may be positioned in windows at least partially obscured by the window-side suites. It is understood that distinct images with the desired viewing angles can be extracted electronically from a single image with a field of view wide enough to encompass the desired viewing angles. However, depending upon the type of camera used, each of these distinct images may capture such a small fraction of the original image that the resulting resolution would be poor. Additionally, digital processing of captured images may lead to undesirable latency, whereby the movement sensed by the passenger would not match the view presented upon the display, potentially leading to increased rather than decreased discomfort. For this reason, in a preferred embodiment, each monitor within the interior passenger suite may be provided video data by a separate camera.

Figure 2:
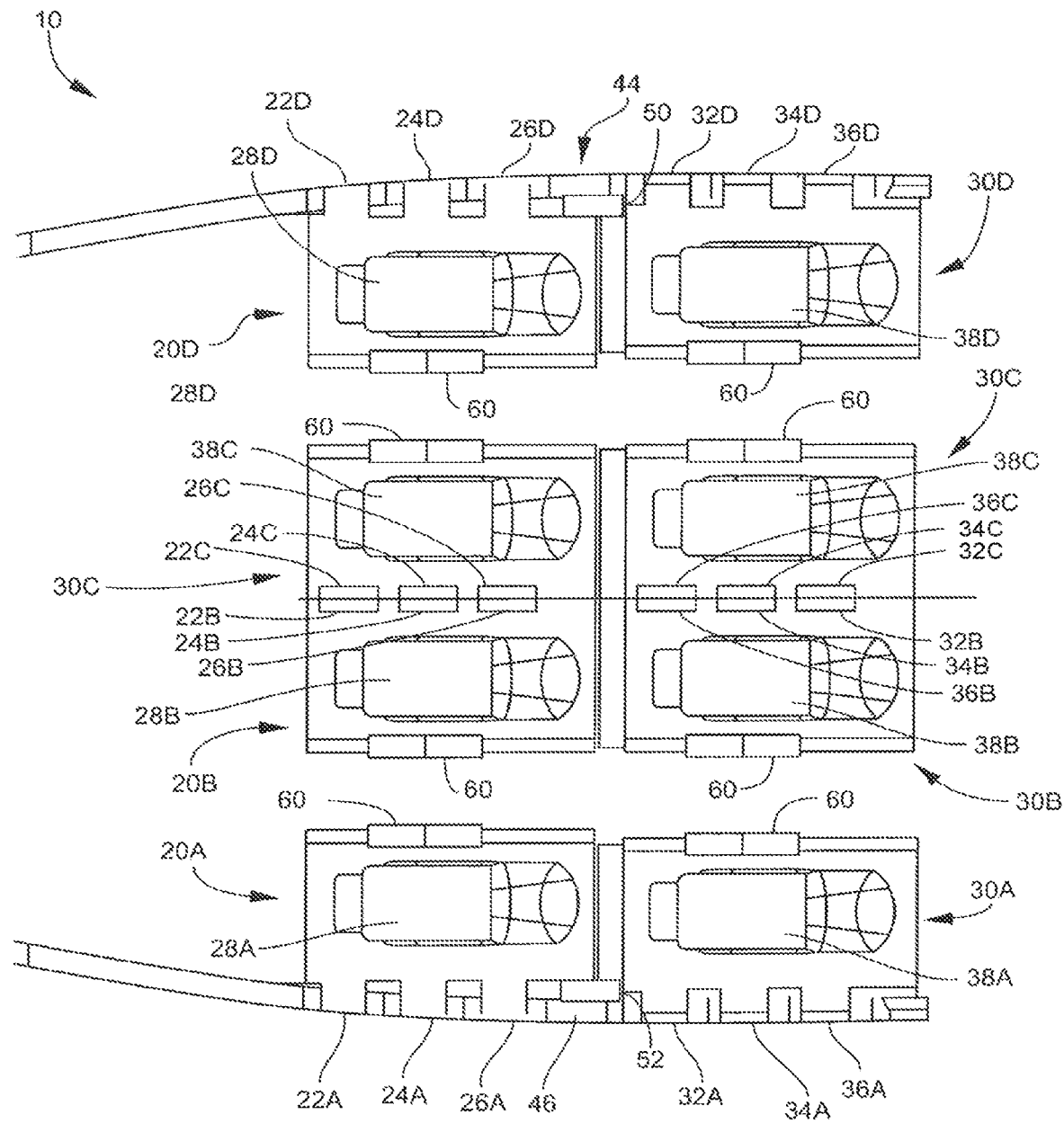
FIG. 2 is a plan view of an aircraft interior having enclosed suites including a video system for providing attitude reference information to aircraft passengers according to an example.

As shown in FIGS. 3, 4, 5 and 6, the orientation of a camera image can be D° (downward) relative to a horizontal plane and F° (forward) relative to a transverse plane according to an example. The angle values D° and F° will be different for each monitor having a different monitor position in relationship to the passenger, which can be represented as D1°, shown in FIGS. 5 and 6, and F1° shown in FIGS. 3 and 4, for the forwardmost monitor in a cabin, D2° and F2° for the second forwardmost monitor in a cabin and so forth. In FIG. 2, three individual monitors are shown in the enclosed suites 20B, 20C, 30B, 30C emulating the three standard windows provided in the suites, 20A, 20D, 30A, 30D. When the internal configurations of the enclosed suites 20B, 20C, 30B, and 30C provide the same relationship between the passenger's 70 eye position (passenger reference position 72) and monitor locations, as in the enclosed suites 20B and 30B in FIG. 2, D1°, D2°, D3°, F1°, F2° and F3° are the same for both suites and the corresponding monitors 22B, 24B, 26B, 32B, 34B, and 36B can display the same respective images. In an example, the passenger reference position 72 can be estimated based on a center position 300, 400a-b of a seat headrest. In an example, the eye position 72 is estimated based on the center position 300, 400a-b of the seat headrest and compensates for a thickness of a passenger's head.

In an aspect, the passenger can be considered as having a notional single eye position between their eyes, where: X is the forward distance from the passenger's 70 eye position to the center of the respective monitor 32B, 34B, 36B, as illustrated in FIGS. 3-6; Y is the transverse distance from the passenger's 70 eye position to the center of the respective monitor 32B, 34B, 36B, as illustrated in FIGS. 3 and 4; Z is the height of eye position above the center of the respective monitor, 32B, 34B, 36B, as illustrated in FIGS. 5 and 6; and R is the horizontal distance from the passenger's eye position to the center of the monitor, according to the formula:

$$R = \mathrm{sqrt}(X^2 + Y^2)$$

In an example, D° in FIG. 5 can be calculated as D°=arctangent(Z/R) and F° in FIG. 3 can be calculated as F°=arctangent(X/Y).

The field of view V° in FIGS. 5 and 6, when measured as the viewing angle presented on the monitor 32B, 34B, 36B, from the upper edge of the monitor, 32B, 34B, 36B, to the lower edge of the monitor, 32B, 34B, 36B, is calculated as the sum of the angle above passenger reference position 72 height to the upper edge of the monitor, 32B, 34B, 36B, and the angle below passenger reference position 72 height to the lower edge of the monitor, 32B, 34B, 36B, where: U is the height of the upper edge of the monitor, 32B, 34B, 36B, above the passenger's eye as illustrated in FIG. 5; L is the height of the passenger reference position 72 above the lower edge of the monitor, 32B, 34B, 36B; and V° can be calculated as V°=arctangent(U/R)+arctangent(L/R).

To use simple lens assemblies, the preferred embodiment employs a different camera/lens combination for each desired field of view. However, for reasons of maximizing parts commonality, the present disclosure could employ, for all cameras in the video system, a camera/lens combination optimized for the widest field of view required and reduce the field of view of the images electronically as required. To increase the robustness, each camera may be designed as using a rigidly mounted lens with a focal length for producing the desired field of view for a monitor a particular distance from a seated passenger within the internal suite. In an example, the lens assembly can include a polarized lens to mitigate glare.

While the present disclosure is particularly well suited to a single passenger 70, it will retain some effectiveness for two passengers seated in close proximity with eye positions (passenger reference positions 72) close to one another as might be found when a couple is seated together on a double seat as shown in FIG. 4. In another example, in the event of a double occupancy suite, monitors may be mounted on either side of the suite to emulate windows on each side of the aircraft.

The view through a typical aircraft window changes in both angle and field of view with changes in the eye position of the passenger. For example, as the passenger 70 moves aft relative to a window, the view shifts to a more forward-looking view. Similarly, as the passenger 70 moves closer to a window, the field of view through the window defines a larger angle. To provide a visual reference that is consistent with the vehicle's maneuvers, a monitor, 32B, 34B, 36B, emulating a window must display an image that approximates the view the passenger 70 would see if the monitor were actually a window. For this reason both the orientation and the field of view of the camera image for the monitor, 32B, 34B, 36B, must be determined based on the passenger reference position 72 of the passenger relative to the monitor, 32B, 34B, 36B.

Accordingly, if multiple monitors, 32B, 34B, 36B, emulating the row of windows (such as 32D, 34D, 36D) commonly found in an airplane are provided to a single passenger, each of the monitors preferably present a different image, with the orientation and field of view of each of the images being determined by the passenger's 70 estimated eye position relative to that respective monitor, 32B, 34B, 36B.

According to one embodiment, the passenger's 70 passenger reference position 72 is calculated using the headrest 62 position of the passenger's seat 38B when in the upright position used during taxi takeoff and landing (TTL). This passenger reference position 72 can be calculated as the seated eye height above the seat cushion and the head length forward of the head rest 300, 400. In addition to its simplicity of execution, the present preference for this method derives from the fact that the seated passenger 70 is obliged to have the seat in the TTL position during the periods of flight when the airplane is making the maneuvers likely to cause motion sickness or discomfort.

In an additional embodiment of the present disclosure, seat position sensors including, but not limited to, a recline position sensor can be employed to estimate the passenger's eye position as passenger reference position 72 when the passenger's seat 38B is not in the TTL position.

As a yet further embodiment of the present disclosure, as shown in FIGS. 3-4, a visual system 64 that recognizes and calculates the position of facial features of the passenger 70 such as is commonly used in range-finding cameras can be used to determine the passenger reference position 72.

The foregoing explanations are not intended to limit the methods of estimating or determining the passenger reference position 72 for the present disclosure. F°, D° and V° can be calculated as described above when using these or other methods of estimating or determining the passenger reference position 72 and images to be displayed on monitors modified by either mechanical, optical or electronic means to adjust F°, D° and V° as required.

Viewing a monitor at an acute angle can distort the perceived image. As used in the present disclosure, particularly as the angle F° increases, the image as viewed can appear compressed in the horizontal axis. This horizontal distortion can be adequately corrected by expanding the image in the horizontal axis by a factor equal to 1/cosine F°. In an example, when V° is calculated as above, the horizontal distortion does not impair the passenger's 70 perception of pitch changes or roll rate from the TTL position and can be ignored. The expansion of the image in the horizontal axis to correct the horizontal distortion when viewed from the TTL position may be objectionable in the cruise mode of flight, as the passenger 70 moves forward in the suite to dine or for other activities.

In an embodiment, the video system can include a sensor configured to estimate the passenger's 70 changing eye position as passenger reference position 72 and a controller configured to adjust F°, D° and V° as required based on a mathematical correction for the horizontal distortion. In an example, the mathematical correction for the horizontal distortion can be done by expanding the image horizontally by 1/cosine F°.

Video Capture Assembly

Airplane passenger windows typically have both a dual pane window and a dust cover proximate the passenger. In an example, an existing dust cover can be removed and the window frame at least partially filled or covered by the video capture assembly 700*a-c* including a glare shield having one or more viewing apertures for each camera to view through. In another example, the video capture assembly 700*a-c* can be placed between the window pane and the dust cover. In an example, the glare shield can be made from a composite lightweight, heat-resistant material or aluminum to provide a reflective surface to avoid overheating of the cameras. The glare shield may, in some embodiments, provide physical support for mounting the camera(s). In other embodiments, the video camera(s) may be mounted on a separate mount assembly connected to the glare shield, such that the glare shield provides little or no support to the video cameras. Although described as a single glare shield, in other embodiments, each video camera may be provided a separate glare shield.

The video capture assembly, including the video camera(s), glare shield(s), and camera mount assembly, may be physically supplied by an aircraft structure selected to maintain movement with the window pane. For example, the camera mount assembly may be configured to mount to an exterior wall of the aircraft.

In some embodiments, the video capture assembly is mounted as close as possible to the aircraft window. To reduce glare and thus reduce the size of antireflective masks upon the glare shield, for example, the video capture assembly may be mounted proximate the aircraft window.

Figures 7A, 7B, 7C:
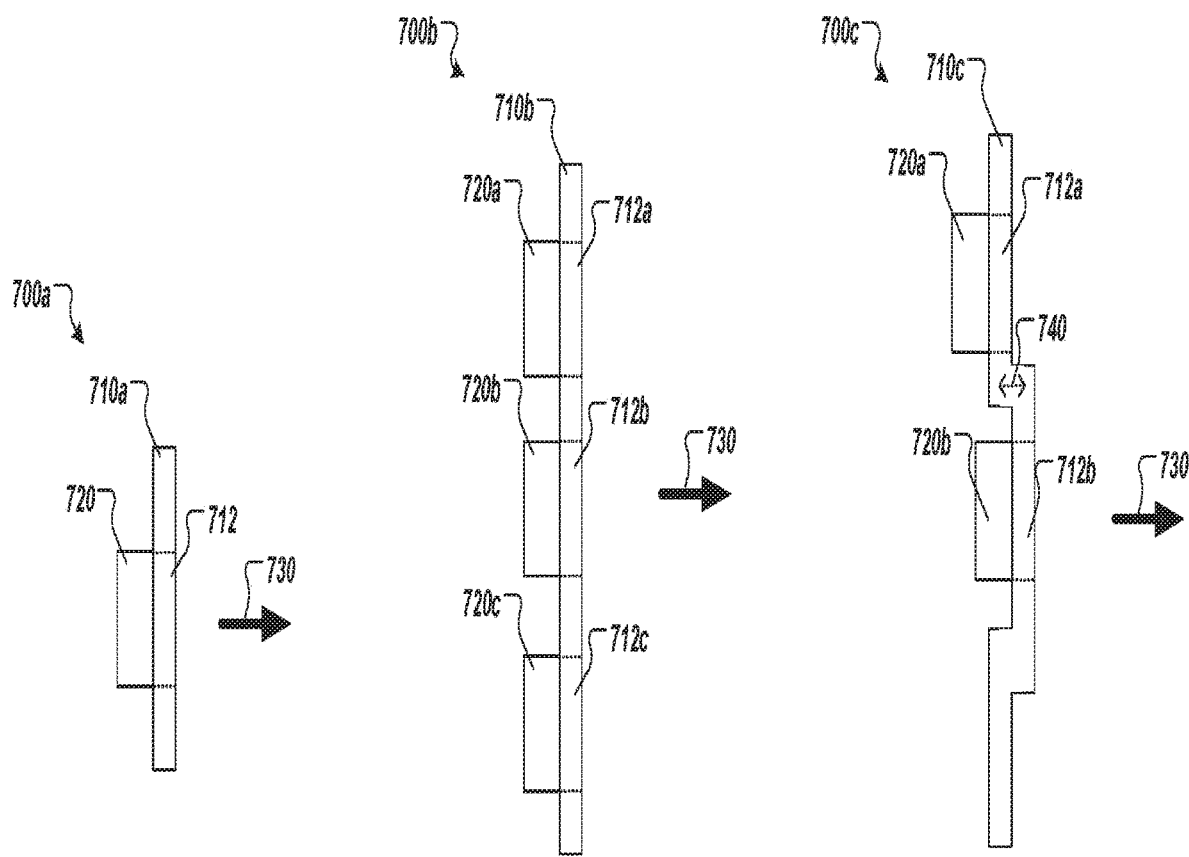
FIG. 7A is a drawing of a side view of a video capture assembly facing an exterior window, the video capture assembly including a glare shield having a viewing aperture and a camera mounted behind the glare shield at the viewing aperture according to an example.
FIG. 7B is a drawing of a side view of a video capture assembly facing an exterior window, the video capture assembly including a glare shield having a set of viewing apertures and a set of cameras, each camera mounted behind the glare shield at a respective viewing aperture according to an example.
FIG. 7C is a drawing of a side view of a video capture assembly including a glare shield having a set of viewing apertures that are offset with respect to the exterior window and a set of cameras, where each camera is mounted behind the glare shield at a respective viewing aperture according to an example.

FIG. 7A is a drawing of a side view of a video capture assembly 700*a* facing an exterior window 730, the video capture assembly 700*a* including a glare shield 710*a* having a viewing aperture 712 and a camera 720 mounted to the glare shield 710*a* at the viewing aperture 712 according to an example.

FIG. 7B is a drawing of a side view of a video capture assembly 700*b* facing the exterior window 730, the video capture assembly 700*b* including a glare shield 710*b* having a set of viewing apertures 712*a-c* and a set of cameras 720*a-c*, where each camera 720*a-c* is mounted behind the glare shield 710*b* at a respective viewing aperture 172*a-c* according to an example.

In an example, the set of viewing apertures 712*a-c* can be configured on the glare shield 710*b* such that each camera 720*a-c* will provide a unique field of view to a respective monitor. In an example, the set of cameras 720*a-c* are positioned with an angular relationship based on the passenger's point of view.

In an example, the set of cameras 720*a-c* can include a first camera that is forward looking and is positioned uppermost on the glare shield 710*b*. The first camera can be relatively more acute and configured to view downward. In an example, the set of cameras 720*a-c* can include a second camera that is forward looking with a less acute angle and is positioned midpoint on the glare shield 710*b*. The second camera can be pitched downward slightly as compared to the first camera. In an example, the set of cameras 720*a-c* can include a third camera that is aft looking and is positioned lowermost on the glare shield 710*b*.

In an example, at least one camera 720*a-c* can be configured to point downward at a same angle relative to a transverse axis of the airplane. In an example, at least one camera 720*a-c* can be tilted to match a downward view directly transverse to the airplane. In an example, when the center of the window is at a seated eye height, the angles of at least one camera 720*a-c* can be straight out from the aircraft. In an example, each camera 720*a-c* can be locked at a particular angular point of view. Alternatively, at least one camera can be adjustable to have an adjustable angular point of view.

In an example, each camera 720*a-c* can have an aperture based on relationship between a viewpoint in the suite and the passenger reference position 72. In an aspect, the aperture can be minimally sized to prevent light from bouncing back to a lens of the camera 720*a-c*. In an example, each camera 720*a-c* can have a lens configured for a pyramidal or canal view.

In an example, a focal length of each camera 720*a-c* can be configured to provide a vertical angular field of view that passengers viewing the monitors will observe. In an example, the video system can be configured to create a vertical angular field of view of the passenger on a respective monitor matching a vertical height of focal length.

Binocular Vision

FIG. 7C is a drawing of a side view of a video capture assembly 700*c* including a glare shield 710*c* having a set of viewing apertures 712*a-b* that are offset with respect to the exterior window 730 and a set of cameras 720*a-b*, where each camera 720*a-b* is mounted behind the glare shield 710*c* at a respective viewing aperture 172*a-b* according to an example. In an example, the video capture assembly 700*c* can be configured for providing binocular vision to the video system. In an aspect, the video system can be configured for 3D display and the passengers can use 3D glasses to view or perceive depth of the video displayed on the monitors.

Anti-Reflection Implements

The video capture assembly 700 can be configured to subdue reflections from the exterior window 730 and re-radiated light that would otherwise reflect into a respective camera 720 in several ways. In some implementations, the video capture assembly can include a glare shield 810-880 configured to subdue reflections. In an example, an anti-reflective mask can be used to limit an amount of light coming into each camera. In another example, an aperture of the camera itself can be blackened out or otherwise treated with an antireflective mask to avoid reflections (not shown).

Figure 8A:
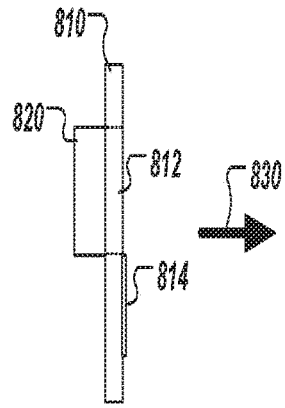
FIG. 8A is a drawing of a side view of a glare shield including an antireflective mask on at least a portion of the glare shield facing the exterior window according to an example.

FIG. 8A is a drawing of a side view of a glare shield 810 including an antireflective mask 814 on at least a portion of the glare shield 810 facing the exterior window 830 according to an example. In an example, the antireflective mask 814 can be a black matte patch adhered to or painted upon the glare shield 810. In another example, the antireflective mask 814 can be made from a rubber. In a further example, the antireflective mask 814 can be a sandblasted and anodized black region of an aluminum glare shield. In an aspect, the antireflective mask 814 can be configured to accommodate a curvature of a particular aircraft. In an example, when the outer pane is substantially flat, the antireflective mask 814 can be configured to cover a portion of the glare shield 810 based on a tilt angle and location of the window pane on a fuselage of the airplane. For example, when the window pane is located above a "belt line" of the fuselage, the window pane can be tilted farther out on a lower side. In an aspect, the antireflective mask 814 can be made from a heat resistant material. Additional aspects of the antireflective mask 814 are shown in FIGS. 9B and 10A-10C as further described below.

Figure 8B:
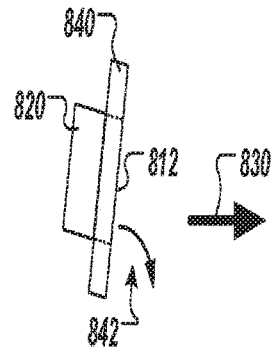
FIG. 8B is a drawing of a side view of a glare shield tilted at an acute tilt angle towards the exterior window according to an example.

In some implementations, a glare shield 840 can be configured to subdue reflections from the exterior window 830 by being tilted at a tilt angle 842, acute or obtuse, with respect to the exterior window 830 (See FIG. 8B).

Figure 8C:
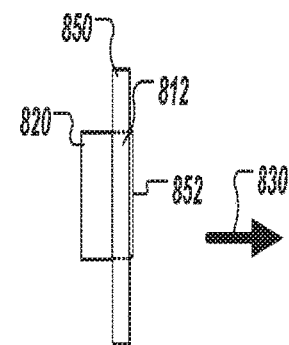
FIG. 8C is a drawing of a side view of a glare shield tilted at an obtuse tilt angle away from the exterior window according to an example.

In some implementations, a glare shield 860 can include a polarized lens configured to subdue reflections from the exterior window 830 (See FIG. 8C).

Figure 8D:
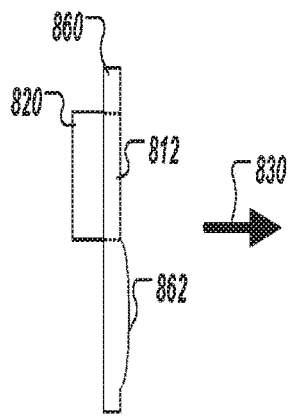
FIG. 8D is a drawing of a side view of a glare shield having a partial convex contour facing the exterior window according to an example.
Figure 8E:
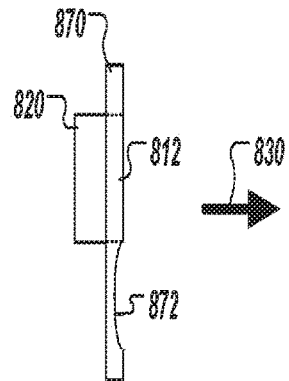
FIG. 8E is a drawing of a side view of a glare shield having a partial concave contour facing the exterior window according to an example.
Figure 8F:
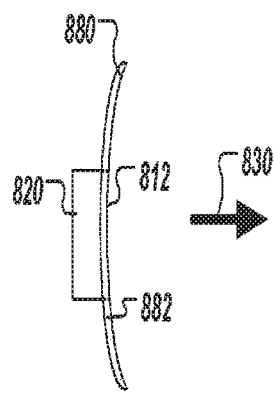
FIG. 8F is a drawing of a side view of a glare shield having a gross concave contour facing the exterior window according to an example.

In some implementations, a glare shield 860, 870 can be configured to subdue reflections from the exterior window 830 by having a partial convex contour 862 (See FIG. 8D) or a partial concave contour 872 (See FIG. 8E) adjacent to a respective viewing aperture or camera. In an example, curvatures of the partial convex contour 862 and the partial concave contour 872 can be based on a distance between the glare shield 860, 870 and the exterior window 830. In another example, a glare shield 880 can be configured to have a gross concave contour 882 with respect to the exterior window 830 (See FIG. 8F).

Figure 9A:
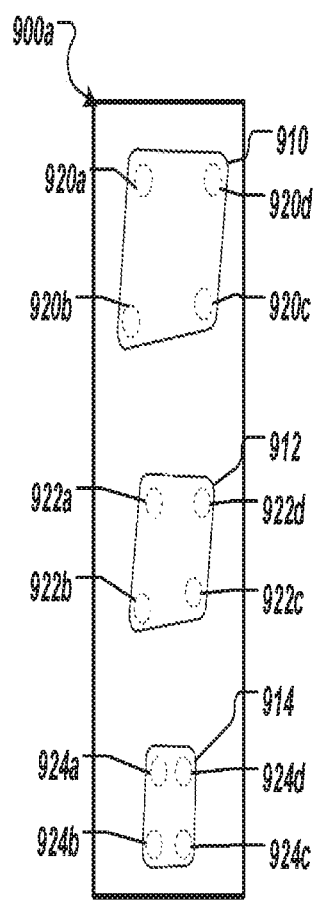
FIG. 9A is a drawing of front view of a glare shield having a set of viewing apertures, each viewing aperture having an aperture shape according to an example.

FIG. 9A is a drawing of front view of a glare shield 900a having a set of viewing apertures 910-914, each viewing aperture 910-914 having an aperture shape according to an example. In an aspect, the aperture shape can be a skewed trapezoid shape configured to enhance reduction of reflections. In an example, the aperture shape can be defined by a set of corners 920-924 and each corner can be further defined by a curvature. For example, the viewing aperture 910 can be configured to have an aperture shape defined by a set of corners 920a-d, the viewing aperture 912 can be configured to have an aperture shape defined by a set of corners 922a-d, and the viewing aperture 914 can be configured to have an aperture shape defined by a set of corners 924a-d. The corners; as illustrated, are inset from the apertures. The distance from the corners to the apertures, in one example, may be set to allow for manufacturing tolerances in manufacturing the glare shields. The aperture may move closer to the corners as manufacturing tolerances increase in accuracy.

Although the apertures 910-914 are illustrated with a particular vertical spacing and a particular horizontal spacing, the horizontal position and vertical position of each of the apertures 910-914 may be modified with little to no effect on the resultant video display. For instance, FIG. 9C is a drawing of a glare shield 900c including the set of the apertures 910-914 arranged in a different spatial configuration according to an example. The spacing, for example, may be selected to optimize reduction of reflections.

Figure 9B:
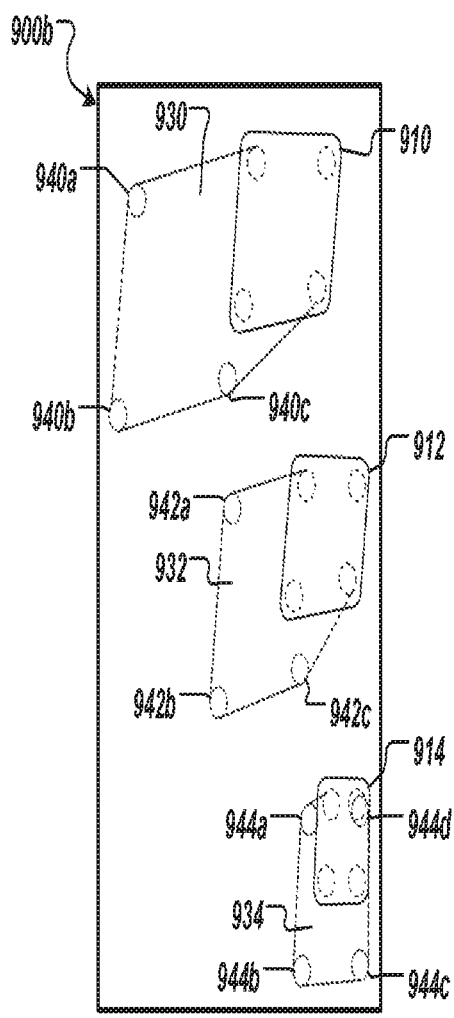
FIG. 9B is a drawing of a glare shield including the set of viewing apertures as shown in FIG. 9A, where each viewing aperture further includes a respective antireflective mask.
Figure 9C:
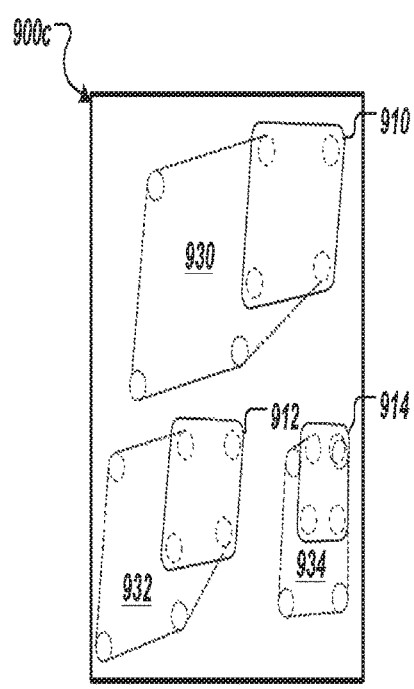
FIG. 9C is a drawing of a glare shield including the set of viewing apertures arranged in a different spatial configuration according to an example.

FIG. 9B is a drawing of a glare shield 900b including the set of viewing apertures 910-914 as shown in FIG. 9A, where each viewing aperture 910-914 further includes a respective antireflective mask 930-934. Each respective antireflective mask 930-934 can be based on a set of extensions 940-944 from the aperture shape according to an example. The set of extensions 940-944 are connected to form a perimeter of the antireflective mask 930-934 (e.g., a minimal border for applying an antireflective treatment to the glare shield 900). In an example, the set of extensions 940-944 can be based on the "F" angle (FIG. 4) as well as the downward angle D and angular field Y (FIG. 5). In an example, the set of extensions 940-944 can be based on lines tangent to the set of corners 920-924. For example, the antireflective mask 930 can be configured to have an anti-reflective mask shape defined by a set of extensions 940a-c, the antireflective mask 932 can be configured to have an antireflective mask shape defined by a set of extensions 942a-c, and the antireflective mask 934 can be configured to have an antireflective mask shape defined by a set of extensions 944a-d.

As discussed, the antireflective masks illustrated in FIGS. 9B and 9C are arranged to provide a minimal footprint of antireflective mask. This may be beneficial, for example, to reduce heating since matte black material causes heat. The spacing of the apertures, further, may be provided to allow for heat dissipation between the antireflective masks.

In other embodiments, the antireflective masks may be arranged as an eye-pleasing display. Since the video capture assembly may be visible from the exterior of the aircraft, the carrier may prefer to have the antireflective masks arranged to present a pattern or evoke an image. This may involve extending the minimal boundary of each antireflective mask to incorporate the artistic details. For example, the footprints of each of the antireflective masks of FIG. 9B may be extended to produce a flower petal or leaf pattern. The trade-off in presenting the antireflective masks in patterns or images would be increased heat caused by the larger regions of anti-reflective masks (e.g., matte black paint or material).

Figure 9D:
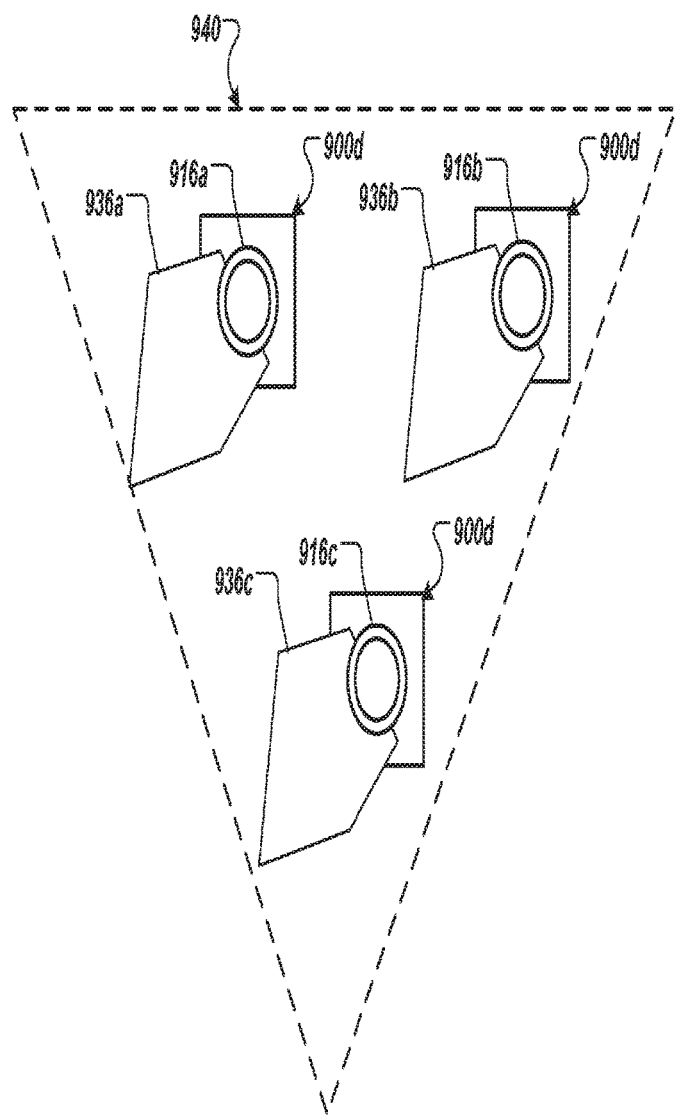
FIG. 9D is a drawing of a set of individual glare shields, each glare shield having an antireflective mask mounted to a particular camera of a video capture assembly according to an example.

FIG. 9D is a drawing of a set of individual glare shields 900d, each glare shield 900d having an antireflective mask 936a-c mounted to a particular camera 916a-c of a video capture assembly. In an example, each glare shield 900d can be positioned separately. In another example, the set of individual glare shields 900d can be configured to form an arranged spatial configuration 940.

Figure 10A:
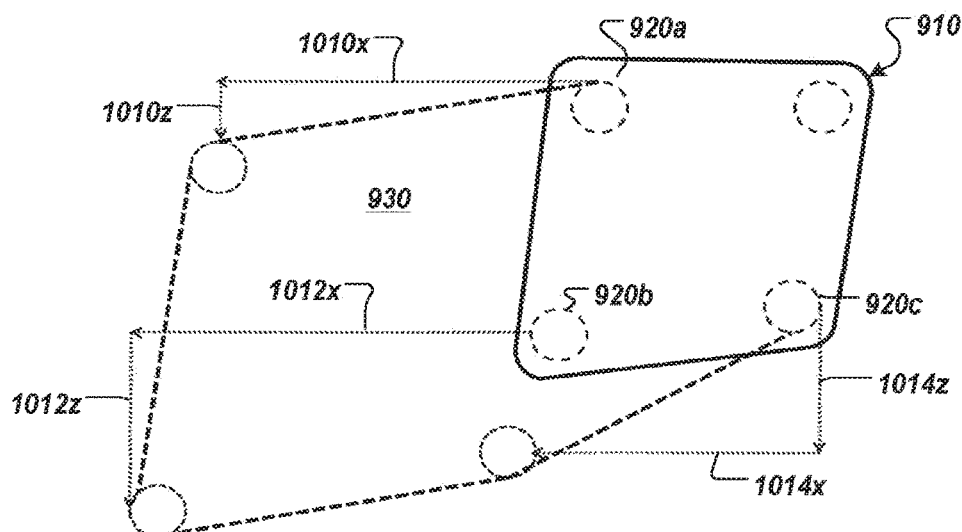
FIGS. 10A-10C are drawings of dimensions of the respective antireflective masks based on the aperture shape according to an example.
Figure 10B:
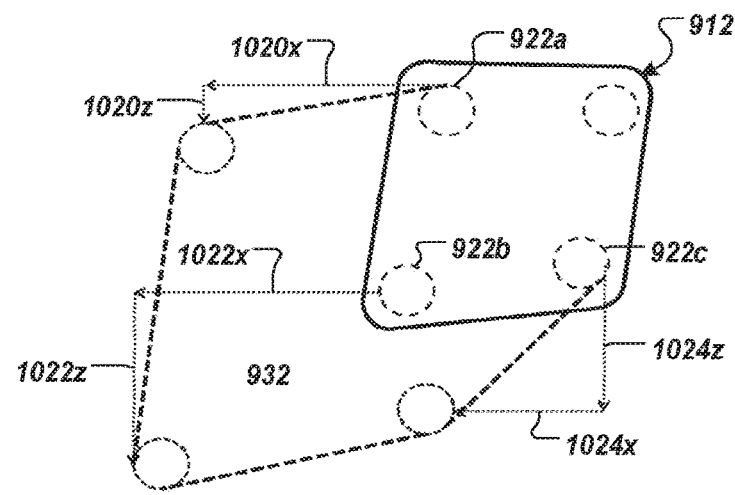
Figure 10C:
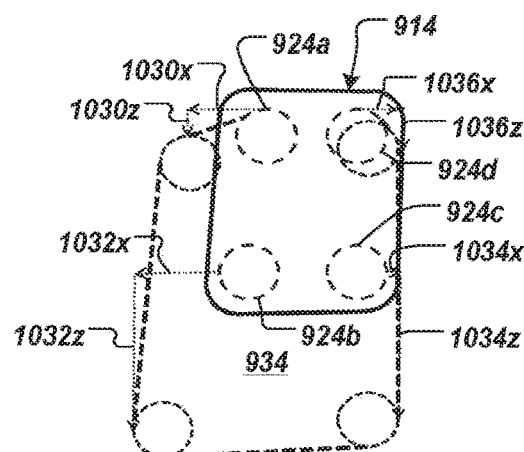
Figure 11A:
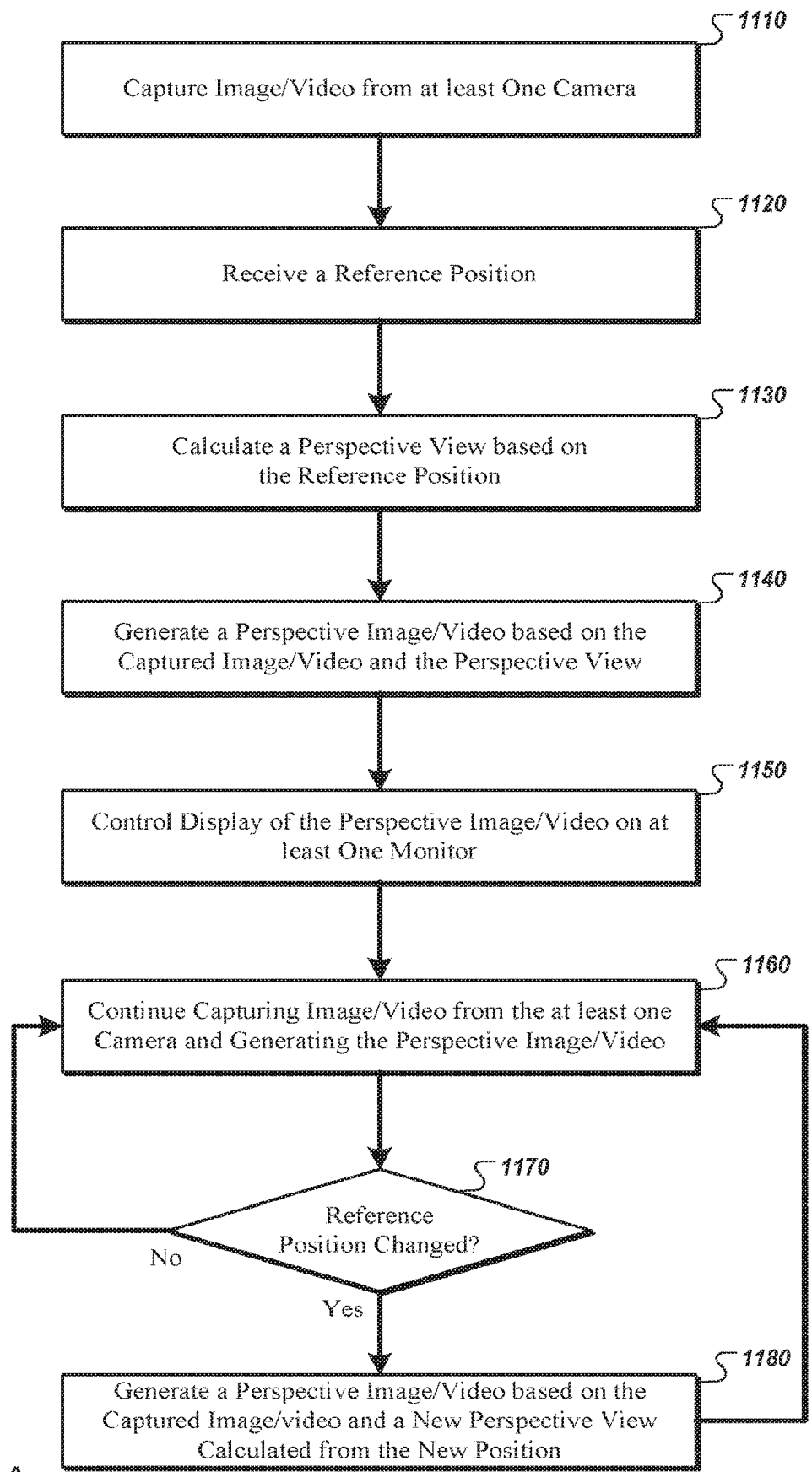
FIG. 11A is a flow chart showing a method for displaying a perspective exterior view of a vehicle within an enclosed suite.
Figure 11B:
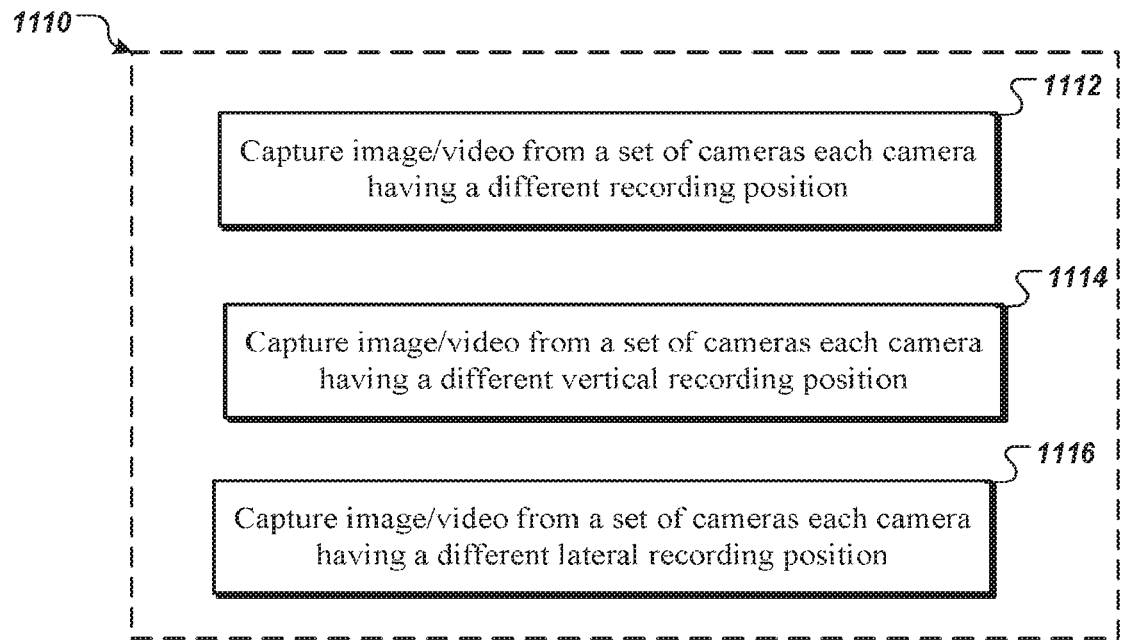
FIG. 11B shows examples of a step of capturing an image/video from at least one camera having a recording position.
Figure 11C:
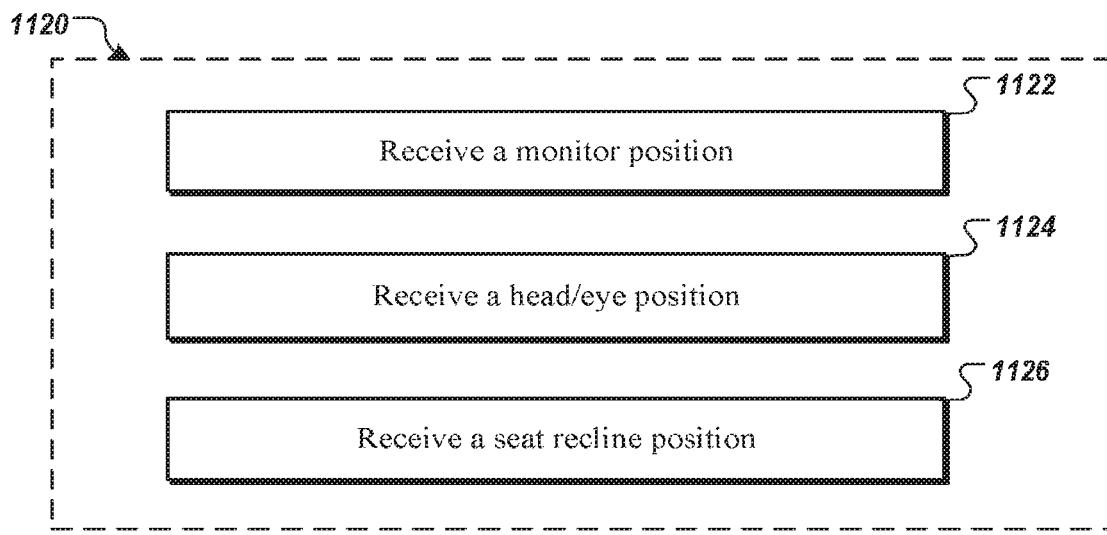
FIG. 11C shows examples of receiving a reference position.

FIGS. 10A-10C are drawings of dimensions of the respective antireflective mask 930-934 based on the aperture shape according to an example. For example, as shown in FIG. 10A, the perimeter of the antireflective mask 930 can be described by an extension 1010x in an x-direction and 1010z in a z-direction from 920a, an extension 1012x in the x-direction and 1012z in the z-direction from 920b, and an extension 1014x in the x-direction and 1014z in the z-direction from 920c. For example, as shown in FIG. 10B, the perimeter of the antireflective mask 932 can be described by an extension 1020x in an x-direction and 1020z in a z-direction from 922a, an extension 1022x in the x-direction and 1022z in the z-direction from 922b, and an extension 1024x in the x-direction and 1024z in the z-direction from 922c. For example, as shown in FIG. 10C, the perimeter of the antireflective mask 934 can be described by an extension 1030x in an x-direction and 1030z in a z-direction from 924a, an extension 1032x in the x-direction and 1032z in the z-direction from 924b, and an extension 1034x in the x-direction and 1034z in the z-direction from 924c. In an aspect, dimensions of each antireflective mask can be minimized to avoid increased heat absorption.

Display Method

A method 1100 is provided for displaying a perspective exterior view of a vehicle within an enclosed suite. The method 1100 can be performed by a series of steps according to an example.

In some implementations, an image/video is captured from at least one camera (1110). In an example, capturing the image/video can include capturing image/video from a set of cameras each camera having a different recording position (1112). In another example, capturing the image/video can include capturing image/video from a set of cameras each camera having a different vertical recording position (1114). In another example, capturing the image/video can include capturing image/video from a set of cameras each camera having a different lateral recording position (1116). In an example, the different lateral recording position can be configured for generating a 3D image/video.

In some implementations, a reference position is received at the controller (1120). Examples of receiving a reference position include receiving a monitor position of a monitor (1122), receiving a head or eye position of a passenger (1124), and receiving a seat recline position (1126). In an example, receiving a monitor position of a monitor (1122) can be done by programming and looking up the monitor position in a look up table stored in memory. In an embodiment a passenger reference position can be received from a sensor as described above. In a further example, the passenger reference position may be a set value determined based on the head rest position.

In some implementations, a perspective view is calculated based on the passenger reference position (1130). In an example, the perspective view can be calculated based on the field of view V° as described in FIGS. 5 and 6.

In some implementations, a perspective image/video is generated based on the captured image/video and the perspective view (1140). In an example, the perspective image/video can be generated by applying the horizontal distortion correction using the controller.

In some implementations display of the perspective image/video on at least one monitor is controlled (1150). In an example, controlling display can include controlling display of the perspective image on an additional monitor, where each additional monitor has a different monitor position. Each camera of two or more cameras, for example, may be angled in accordance of an appropriate view for each monitor of two or more monitors. Controlling the display may include presenting the image/video captured by the appropriate camera to the appropriate monitor.

The method 1100, in some implementations, continues with capturing image or video data from the at least one camera and generating the perspective image/video for display on the at least one monitor (1160).

In some implementations, the passenger reference position may change during image/video capture and display (1170). In some examples, a parent may switch seats with a child, resulting in a much lower head position, or a passenger may recline the passenger seat. In the event that a position sensor identifies substantial displacement of the passenger's head position or movement of the passenger seat into the reclined position, the movement may result in a new reference position (e.g., such as the reference position described in relation to step 1120).

In some implementations, a perspective image/video is generated based on the captured image/video and a new perspective view calculated from the new position (1180). The perspective view, in some embodiments, is adjusted digitally. For example, images captured by the at least one camera may be filtered to a new perspective view. In other embodiments, the perspective view is adjusted by switching to different camera(s). In another example, a first camera or set of cameras may be mounted to provide an appropriate display when the passenger is in the upright position, while a second camera or set of cameras may be mounted to provide an appropriate display when the passenger is in a reclined position.

Upon setting the new perspective view, image/video may continue to be captured and video generated and displayed as described above (1160).

Additional Features

In some implementations, the video system can be configured to filter blue light displayed on the monitors. Blue light is known to activate cells in the eye that can affect alertness. Compared to viewing from an actual window, the video system configured to filter blue light can aid the passenger in preparing to sleep.

In some implementations, the video system can be configured to selectively display views from an opposite side of the airplane. For instance, a video system positioned on a right side of the airplane can be overridden to display a view from a video system positioned on a left side of the airplane. This feature can be useful in instances when the flight crew identifies landmarks that can be viewed from an actual window on a particular side of the airplane. For example, the airline captain or crew may briefly override the image feed to display a landmark such as the Grand Canyon to the passenger.

Referring now to FIGS. 12A-22, some embodiments are depicted that provide minimum-latency direct camera-to-monitor feed(s) while offering fields of view adapting a passenger moving to different positions (e.g., a first position and a second position). As used throughout, in some embodiments, the first and/or second position may refer to a position(s) of a three-dimensional continuum of positions at a point in time. In some embodiments, the first and/or second position may refer to a predetermined position(s), such as a TTL position. Some embodiments may utilize, at least in part, one or more direct feeds (e.g., a direct SDI feed) from camera(s) to monitor(s) to minimize image latency.

Referring now to FIGS. 12A-14, an exemplary system of a vehicle (e.g., an aircraft) is depicted where at least one switch 1310 is configured to switch camera feeds to maintain correct field(s) of view depicted on at least one virtual window monitor (e.g., 1202, 1204, and/or 1206) for multiple positions that a passenger may be situated in the vehicle.

Figure 12B:
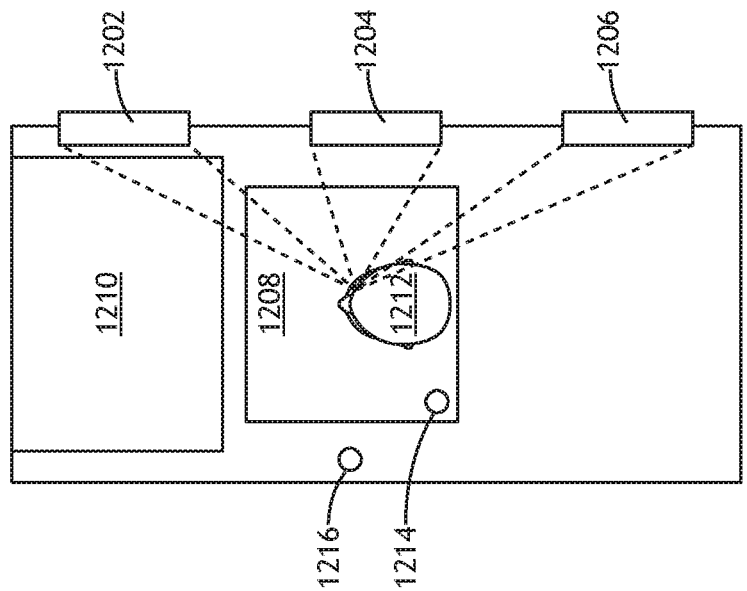
FIG. 12B depicts the passenger in a second position (e.g., a work or dine position).
Figure 12A:
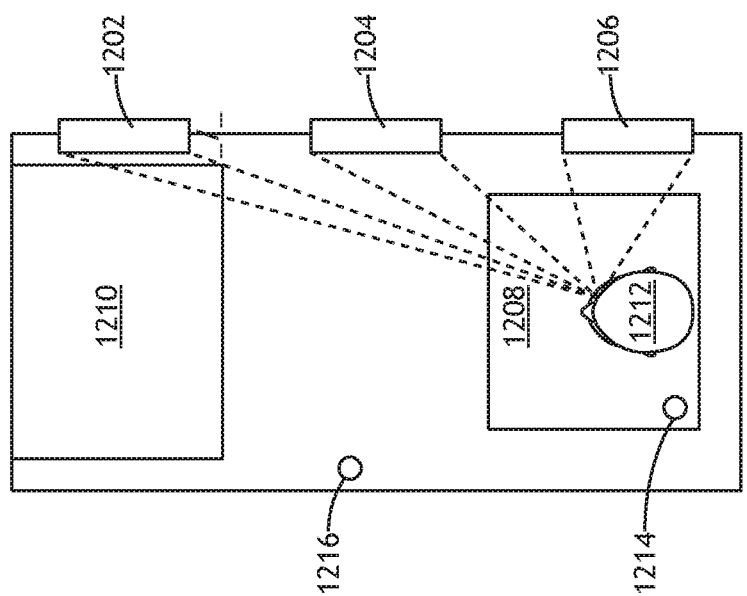
FIG. 12A depicts a passenger in a first position (e.g., a TTL position).

Referring to FIGS. 12A-B, views of an exemplary passenger suite (e.g., a windowless passenger suite) are depicted. FIG. 12A depicts a passenger 1212 in a first position (e.g., a TTL position). FIG. 12B depicts the passenger 1212 in a second position (e.g., a work or dine position). The passenger suite may include at least one virtual window monitor 1202, 1204, 1206, a seat 1208, a table 1210 (e.g., a desk), a passenger 1212, and at least one sensor (e.g., sensor 1214 and/or 1216). When the passenger 1212 is in the first position, the at least one switch 1310 may feed video from a first subset of cameras (e.g., 1302, 1304, and/or 1306) to the at least one virtual window monitor 1202, 1204, 1206. When the passenger 1212 is in the second position, the at least one switch 1310 may feed video from a second subset of cameras (e.g., 1304, 1306, and/or 1308) to the at least one virtual window monitor 1202, 1204, 1206.

Figure 13B:
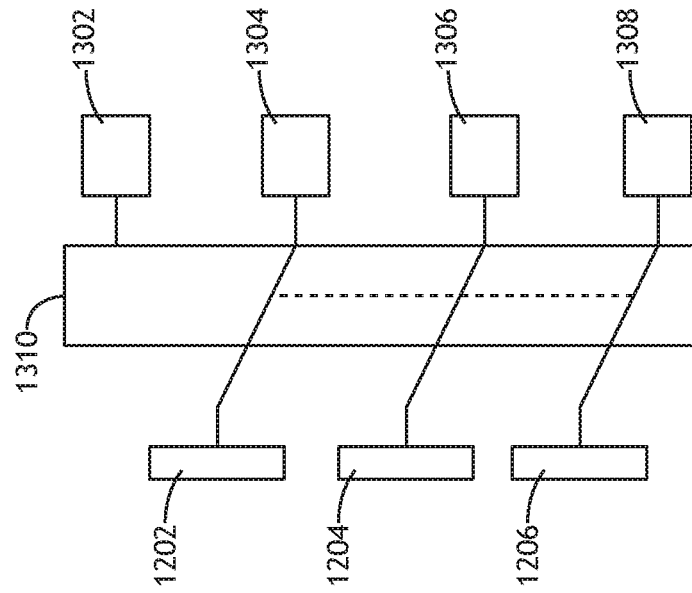
FIG. 13B depicts the at least one switch feeding video from a second subset of cameras to the at least one virtual window monitor when the passenger is in the second position.
Figure 13A:
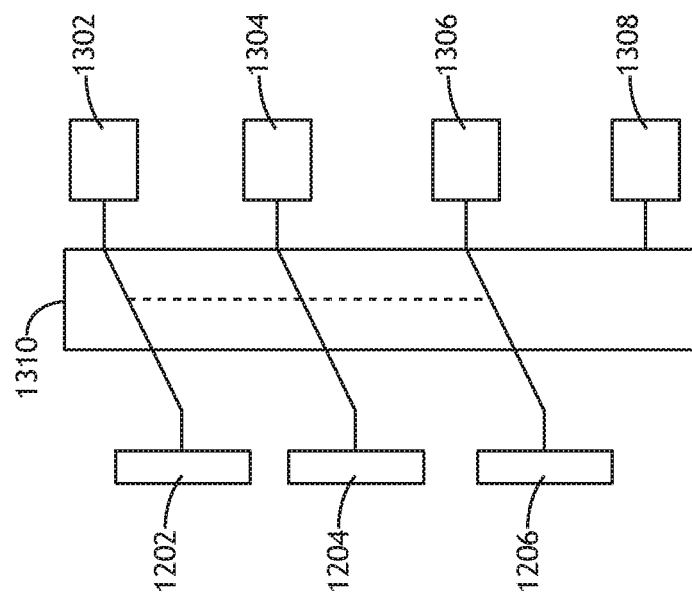
FIG. 13A depicts at least one switch feeding video from a first subset of cameras to at least one virtual window monitor when the passenger is in the first position (e.g., a TTL position).

Referring now to FIGS. 13A-B, exemplary views of the at least one switch 1310, the at least one virtual window monitor 1202, 1204, 1206, and at least two cameras 1302, 1304, 1306, 1308 are depicted. FIG. 13A depicts the at least one switch 1310 feeding video from a first subset of cameras (e.g., 1302, 1304, and/or 1306) to the at least one virtual window monitor 1202, 1204, 1206 when the passenger 1212 is in the first position (e.g., a TTL position). FIG. 13B depicts the at least one switch 1310 feeding video from a second subset of cameras (e.g., 1304, 1306, and/or 1308) to the at least one virtual window monitor 1202, 1204, 1206 when the passenger 1212 is in the second position.

Figure 14:
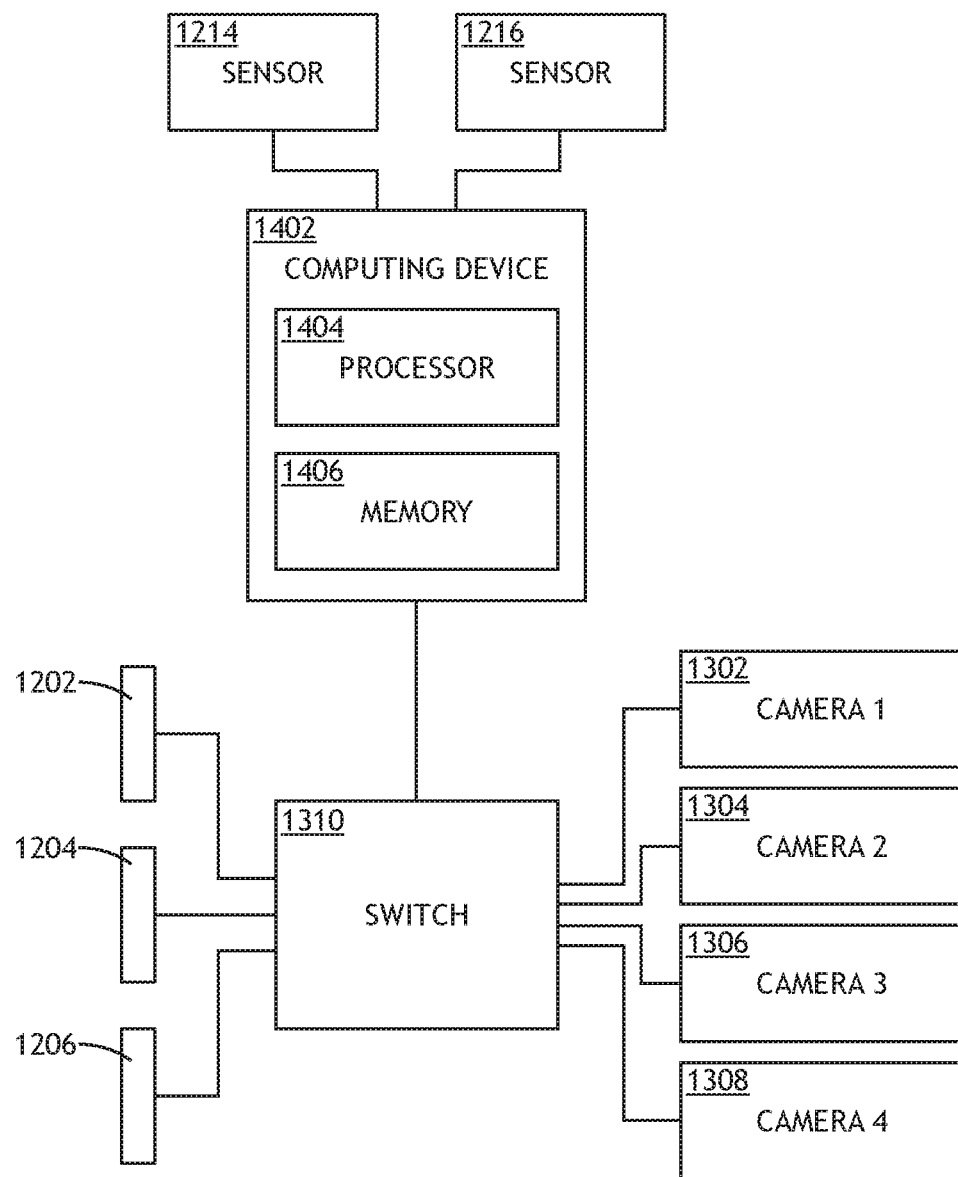
FIG. 14 shows an exemplary system.

Referring now to FIG. 14, an exemplary system (e.g., a vehicular system, such as an aircraft system) is depicted. The system may include at least one virtual window monitor 1202, 1204, 1206, at least two cameras 1302, 1304, 1306, 1308, at least one switch 1310, at least one computing device 1402, and at least one sensor (e.g., sensor 1214 and/or 1216).

Each of the at least one virtual window monitor 1202, 1204, 1206 may be implemented as a virtual window. Each of the at least one monitor 1202, 1204, 1206 may be configured to display a given view outside of a vehicle. Each view may correspond to a field of view of the passenger 1212 looking at a given monitor as if the given monitor were a real vehicle window. The monitor 1202 may be implemented as a forward monitor. The monitor 1204 may be implemented as a middle monitor. The monitor 1206 may be implemented as an aft monitor.

Each of the at least two cameras 1302, 1304, 1306, 1308 may be configured to capture video of the given view outside of the vehicle, where the given view may correspond to the field of view of the passenger looking at the given monitor as if the given monitor were the real vehicle window. In some embodiments, a quantity of the at least two cameras 1302, 1304, 1306, 1308 may be greater than a quantity of the at least one virtual window monitor 1202, 1204, 1206.

The at least one switch 1310 may be implemented as a single switch or multiple switches. For example, the at least one switch 1310 may be implemented as a double channel, double throw switch or a triple channel, double throw switch. For example, when the passenger 1212 is in the first position, the at least one switch 1310 may be configured to: feed video from the first camera 1302 to the first monitor 1202, feed video from the second camera 1304 to the second monitor 1204, and feed video from the third camera 1306 to the third monitor 1206. For example, when the passenger 1212 is in the second position, the at least one switch 1310 may be configured to: feed video from the second camera 1304 to the first monitor 1202, feed video from the third camera 1306 to the second monitor 1204, and feed video from the fourth camera 1308 to the third monitor 1206.

In some embodiments, the current position (e.g., the first position or the second position) of the passenger 1212 may be determined by at least one sensor. The at least one sensor may include at least one sensor 1214 and/or at least one sensor 1216. For example, the at least one sensor 1216 may be implemented as a camera configured to sense a position of an eye or a head of the passenger 1212. For example, the at least one sensor 1214 may be implemented as a seat position sensor configured to detect a position of the seat 1208 that the passenger 1212 occupies.

The at least one computing device 1402 may include at least one processor 1404, at least one memory 1406, and at least one storage device, some or all of which may be communicatively coupled at any given time. The at least one processor 1404 may be configured to obtain sensor data from the at least one sensor 1214 and/or the at least one sensor 1216, to determine a current position of the passenger 1212 or a current eye or head position of the passenger 1212, to switch the at least one switch 1310 from a first state to at least a second state based on the determined current position, and/or to perform any or all of the operations disclosed throughout. The at least one computing device 1402 may be implemented as any suitable computing device or any combination of suitable computing devices.

For example, three cameras 1302, 1304, 1306 may provide correct fields of view for the TTL position and feed the virtual window monitors 1202, 1204, 1206 when the seat 1208 is in the TTL position. In some embodiments, when in the work/dine position, the field of view toward the forward window 1202 is similar to the field of view toward the middle window 1204 when the seat 1208 is in the TTL position, and similarly, when in the work/dine position the field of view toward the middle window 1204 is similar to the field of view toward the aft window 1206 when in the TTL position. For example, a fourth camera 1308 may provide the correct field of view for the aft virtual window 1206 when the seat 1208 is in the work or dine position. As such, the at least one switch 1310 may feed video from a first subset of cameras (e.g., 1302, 1304, and/or 1306) to the at least one virtual window monitor 1202, 1204, 1206 when the passenger 1212 is in the first position (e.g., a TTL position) and feed video from a second subset of cameras (e.g., 1304, 1306, and/or 1308) to the at least one virtual window monitor 1202, 1204, 1206 when the passenger 1212 is in the second position, while providing direct video feeds through the switch 1310 to minimize latency.

Figure 15A:
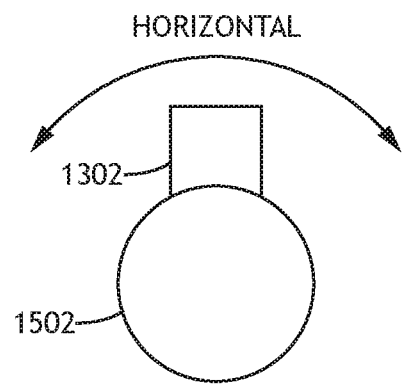
FIG. 15A shows a pivot motor configured to change a horizontal orientation of a field of view of a camera.
Figure 15B:
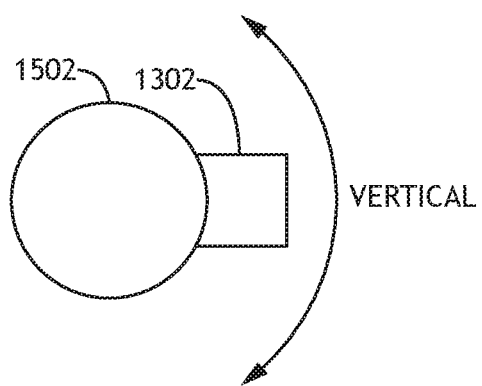
FIG. 15B shows a pivot motor configured to change a vertical orientation of a field of view of a camera.
Figure 15C:
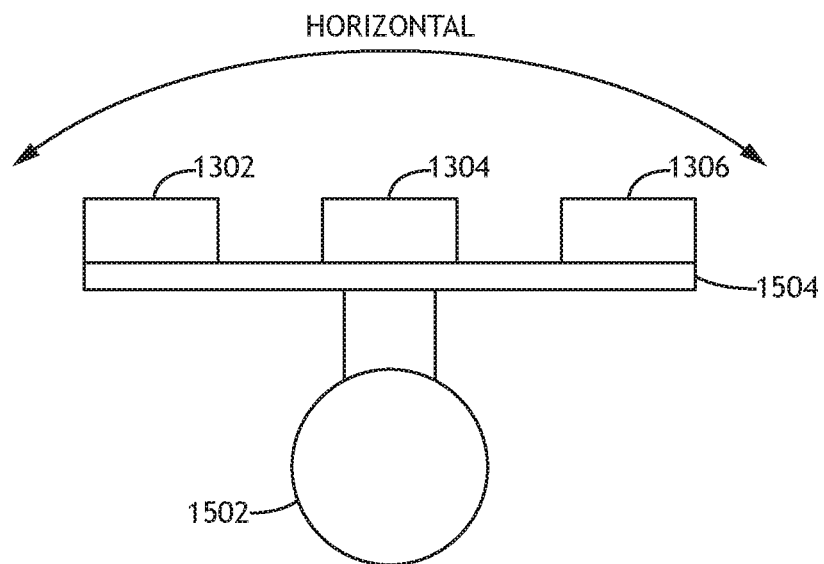
FIG. 15C shows a pivot motor configured to change a horizontal orientation of multiple cameras.
Figure 15D:
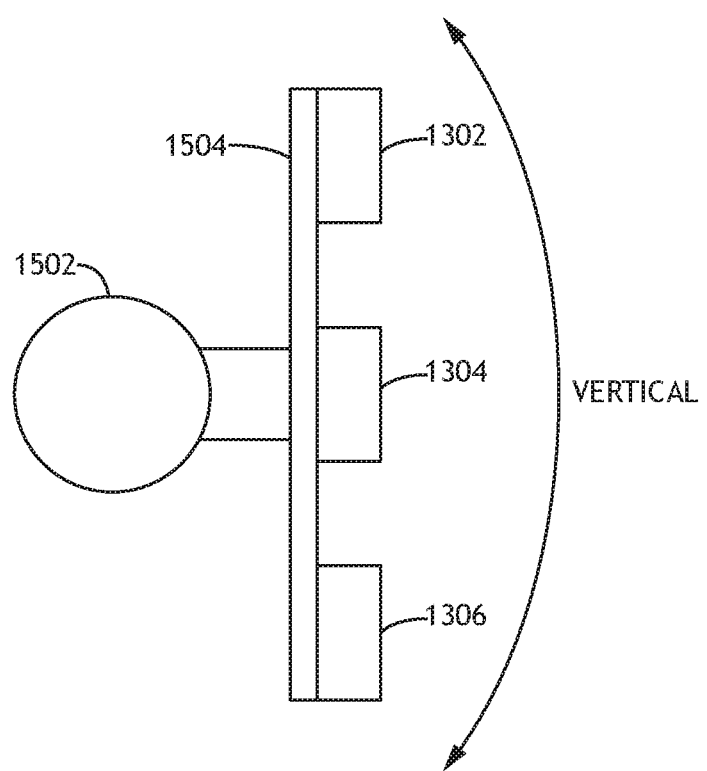
FIG. 15D shows a pivot motor configured to change a vertical orientation of a field of view of multiple cameras.
Figure 16:
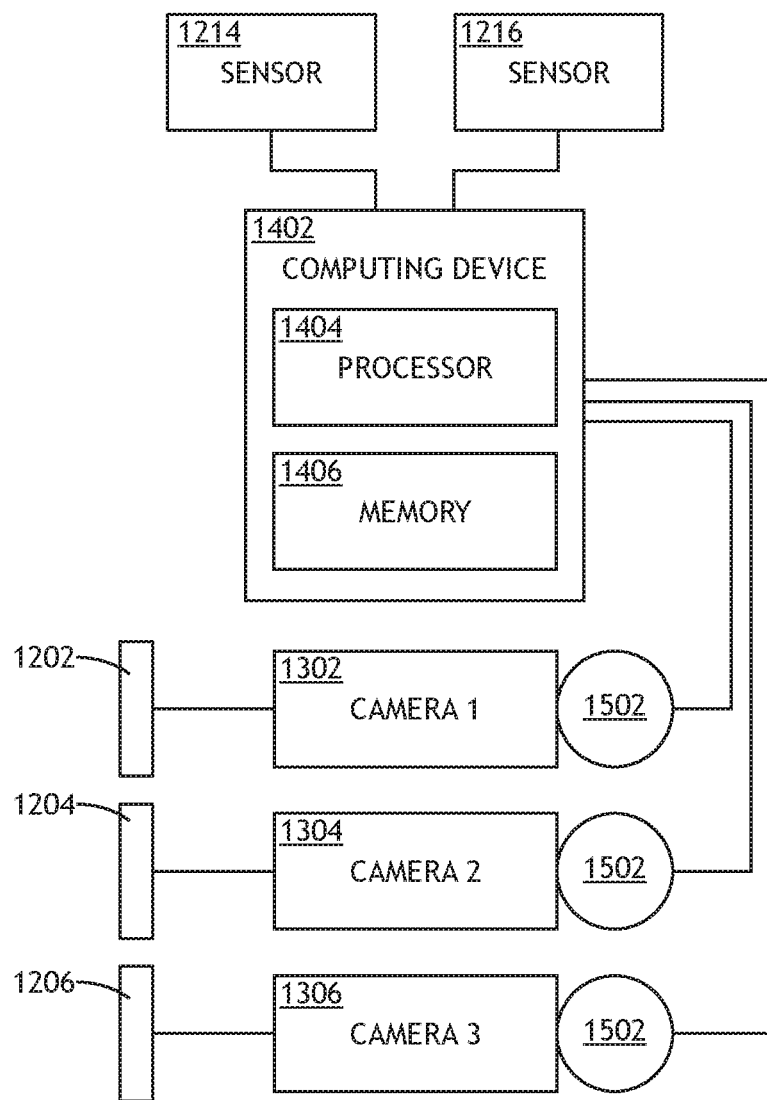
FIG. 16 shows an exemplary system.

Referring now to FIGS. 15A-16, an exemplary system of a vehicle (e.g., an aircraft) is depicted where the system includes at least one pivot motor 1502 configured to maintain correct field(s) of view depicted on at least one virtual window monitor (e.g., 1202, 1204, and/or 1206) for multiple positions that a passenger 1212 may be situated in the vehicle. For example, some embodiments may minimize latency by providing one or more direct feeds (e.g., a direct SDI feed) from camera(s) to monitor(s) while utilizing at least one pivot motor 1502 configured to maintain correct field(s) of view depicted on at least one virtual window monitor (e.g., 1202, 1204, and/or 1206) for multiple positions that a passenger 1212 may be situated in the vehicle.

Referring now to FIGS. 15A-D, FIGS. 15A-D depict at least one pivot motor 1502 configured to change an orientation of a field of view of at least one camera 1302, 1304, 1306 relative to the vehicle based on a position of the passenger 1212.

In some embodiments, in response to the passenger 1212 changing positions, the at least one camera 1302, 1304, 1306 may be mechanically pivoted to provide a correct orientation(s) and camera lenses may be zoomed to provide correct vertical angular field of view V°. For example, correct angles for F°, D°, and V° can be calculated based on an estimate of a passenger's eye position provided by a seat position sensor or a camera. While pivoting and lens zooming mechanisms may not be instantly responsive, any delays in accurately orienting cameras may not introduce any latency into the image. Aircraft maneuvers may be portrayed with no more latency than that intrinsic to the direct cameras to monitor feed.

As shown in FIGS. 15A-B, a pivot motor 1502 may be configured to change at least one of a horizontal or a vertical orientation of a field of view of a camera 1302 relative to the vehicle based on a position of the passenger 1212. Some embodiments, may include any number of pivot motors 1502 each coupled to a particular camera (e.g., 1302, 1304, 1306).

As shown in FIGS. 15C-D, a pivot motor 1502 may be configured to change at least one of a horizontal or a vertical orientation of fields of view of cameras 1302, 1304, 1306 relative to the vehicle based on a position of the passenger 1212. The pivot motor 1502 may be mounted to a bracket 1504, and the cameras 1302, 1304, 1306 may be mounted to the bracket. As such, the pivot motor 1502 may be configured to change horizontal and/or vertical orientations of fields of view of all of the cameras 1302, 1304, 1306. Some embodiments, may include any number of pivot motors 1502 each configured to change horizontal and/or vertical orientations of fields of view of any number of cameras 1302, 1304, 1306. In some embodiments, an alignment for such bracketed configuration may have all angles correct in the TTL position and pivot the bracket so as to maintain the correct forward angle (F°) for the most central camera 1304. In such embodiments, since the most dramatic angular changes resulting from changes in seating position may occur in the forward viewing angle, such embodiments may be acceptable to the passenger.

Referring now to FIG. 16, an exemplary system (e.g., a vehicular system, such as an aircraft system) is depicted. The system may include at least one virtual window monitor 1202, 1204, 1206, at least one camera 1302, 1304, 1306, at least one pivot motor 1502, at least one computing device 1402, and at least one sensor (e.g., sensor 1214 and/or 1216).

Each of the at least one virtual window monitor 1202, 1204, 1206 may be implemented as a virtual window. Each of the at least one monitor 1202, 1204, 1206 may be configured to display a given view outside of a vehicle. Each view may correspond to a field of view of the passenger 1212 looking at a given monitor as if the given monitor were a real vehicle window. The monitor 1202 may be implemented as a forward monitor. The monitor 1204 may be implemented as a middle monitor. The monitor 1206 may be implemented as an aft monitor.

Each of the at least one camera 1302, 1304, 1306 may be configured to capture video of the given view outside of the vehicle, where the given view may correspond to the field of view of the passenger looking at the given monitor as if the given monitor were the real vehicle window. In some embodiments, a quantity of the at least one camera 1302, 1304, 1306 may be equal to a quantity of the at least one virtual window monitor 1202, 1204, 1206. In some embodiments, each of the at least one camera 1302, 1304, 1306 may be configured to change an amount of zoom based on the position of the passenger 1212. For example, the each of the at least one camera 1302, 1304, 1306 may receive an instruction from the computing device 1402 to change the amount of zoom based on the position of the passenger 1212, and in response to receiving the instruction, each of the at least one camera 1302, 1304, 1306 may be configured to change the amount of zoom. In some embodiments, each of the at least one camera 1302, 1304, 1306 may have a fixed focal length lens providing the correct vertical angular field of view for the TTL position. Each of the at least one camera 1302, 1304, 1306 may directly feed a given monitor of the at least one virtual window monitor 1202, 1204, 1206.

Each of the at least one pivot motor 1502 may be configured to change an orientation of a field(s) of view of one or more of the at least one camera 1302, 1304, 1306 relative to the vehicle based on a position of the passenger 1212. For example, each of the at least one pivot motor 1502 may receive an instruction from the computing device 1402 to change an orientation of a field(s) of view of one or more of the at least one camera 1302, 1304, 1306 relative to the vehicle based on a position of the passenger 1212, and in response to receiving the instruction, each of the at least one pivot motor 1502 may be configured to change an orientation of a field(s) of view of one or more of the at least one camera 1302, 1304, 1306 relative to the vehicle.

In some embodiments, the current position (e.g., the first position or the second position) of the passenger 1212 may be determined by at least one sensor. The at least one sensor may include at least one sensor 1214 and/or at least one sensor 1216. For example, the at least one sensor 1216 may be implemented as a camera configured to sense a position of an eye or a head of the passenger 1212. For example, the at least one sensor 1214 may be implemented as a seat position sensor configured to detect a position of the seat 1208 that the passenger 1212 occupies.

The at least one computing device 1402 may include at least one processor 1404, at least one memory 1406, and at least one storage device, some or all of which may be communicatively coupled at any given time. The at least one processor 1404 may be configured to obtain sensor data from the at least one sensor 1214 and/or the at least one sensor 1216, to determine a current position of the passenger 1212 or a current eye or head position of the passenger 1212, to provide an instruction(s) to the at least one pivot motor 1502 to change an orientation of a field(s) of view of one or more of the at least one camera 1302, 1304, 1306 based on the determined current position, to provide an instruction(s) to each of the at least one camera 1302, 1304, 1306 to change an amount of zoom of a particular camera based on the determined current position, and/or to perform any or all of the operations disclosed throughout. The at least one computing device 1402 may be implemented as any suitable computing device or any combination of suitable computing devices.

For example, the system may include three cameras 1302, 1304, 1306, three monitors 1202, 1204, 1206, and one pivot motor 1502. In some embodiments, the pivot motor 1502 may be configured to change the orientation of the field of view of a first camera 1302 based on the position of the passenger 1212, to change an orientation of a field of view of a second camera 1304 based on the position of the passenger 1212, and to change an orientation of a field of view of a third camera 1306 based on the position of the passenger 1212.

Additionally, for example, the system may include three cameras 1302, 1304, 1306, three monitors 1202, 1204, 1206, and three pivot motors 1502. In some embodiments, a first pivot motor 1502 may be configured to change an orientation of a field of view of a first camera 1302 based on the position of the passenger 1212. A second pivot motor 1502 may be configured to change an orientation of a field of view of a second camera 1304 based on the position of the passenger 1212. A third pivot motor 1502 may be configured to change an orientation of a field of view of a third camera 1306 based on the position of the passenger 1212.

Referring now to FIGS. 17-19D, an exemplary system of a vehicle (e.g., an aircraft) is depicted where at least one switch 1310 is configured to switch camera feeds to maintain correct field(s) of view depicted on at least one virtual window monitor (e.g., 1202, 1204, and/or 1206) for multiple positions that a passenger may be situated in the vehicle. In some embodiments, at least one camera 1302, 1304, 1306 may be fixed-orientation fixed-field-of-view cameras that provide video feed(s) to the at least one monitor 1202, 1204, 1206 when the passenger 1212 is in a TTL position, and the system may include at least one additional camera 170 (e.g., a moveabout camera) that provides video feed(s) to at least one processor 1404 executing image editor software 1702 that in turn provides video feed(s) to the at least one monitor 1202, 1204, 1206 when the passenger 1212 is in a second position (e.g., not in a TTL position). In some embodiments, the passenger's position may be determined by seat position sensors, activation of the aircraft "fasten seat belt" sign, or cameras. In some embodiments, when, the passenger 1212 is free to move about and/or moves from the TTL position, in lieu of the fixed cameras, a computer-controlled vision system may feed the virtual window monitors. In such embodiments, one or more additional "moveabout" cameras 1704 feed the virtual window displays through a processor 1404 executing image editor software 1702. For example, some embodiments may minimize latency by providing one or more direct feeds (e.g., a direct SDI feed) from fixed camera(s) to monitor(s) when the passenger 1212 is in a first position (e.g., a TTL position) and providing a computer-controlled vision system to feed the virtual window monitors when the passenger 1212 is not in the first position (e.g., in a second position).

Figure 17:
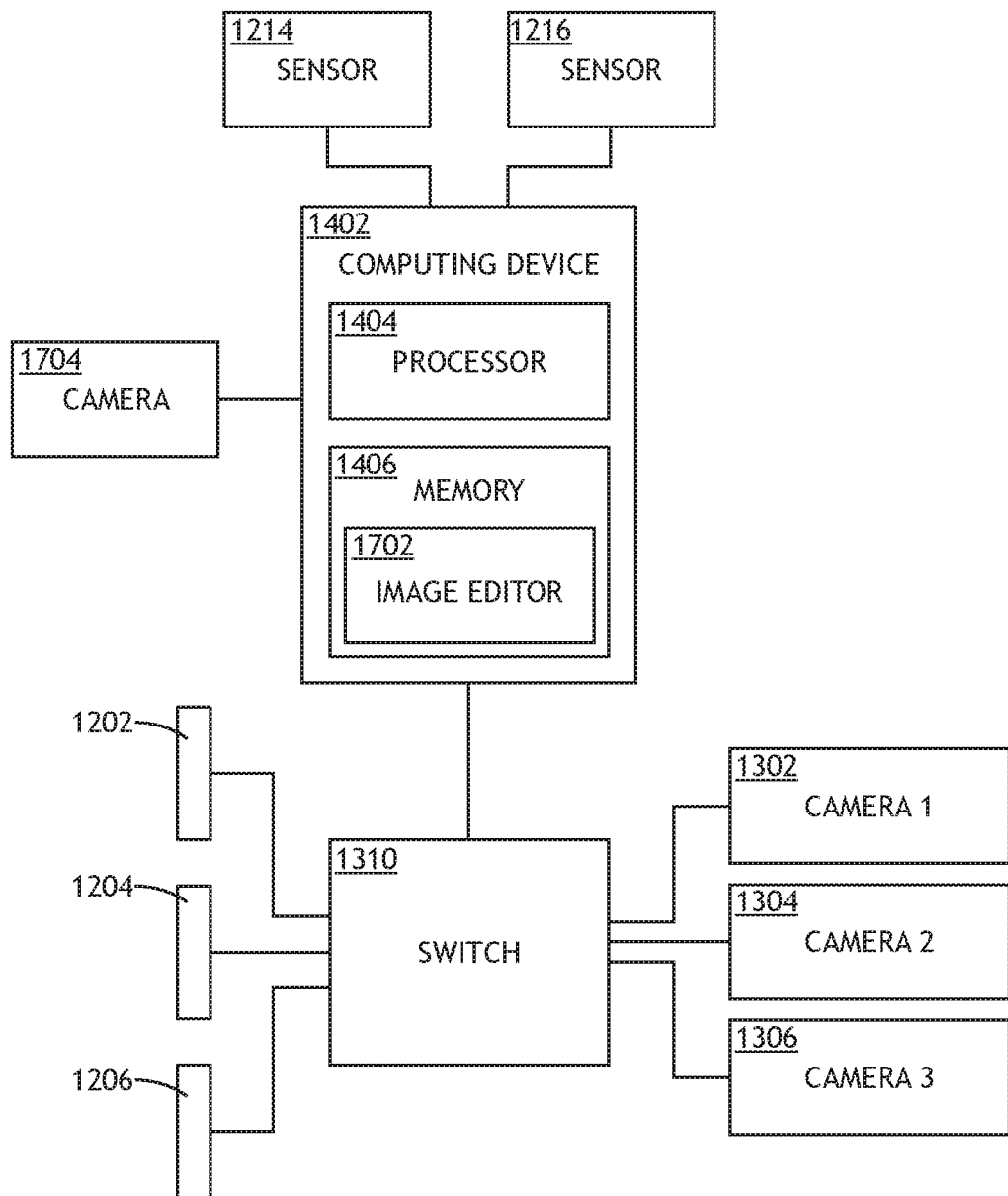
FIG. 17 shows an exemplary system.

Referring to FIG. 17, an exemplary system (e.g., a vehicular system, such as an aircraft system) is depicted. The system may include at least one virtual window monitor 1202, 1204, 1206, at least one camera 1302, 1304, 1306, at least one switch 1310, at least one computing device 1402, at least one sensor (e.g., sensor 1214 and/or 1216), and at least one additional camera 1704.

Each of the at least one virtual window monitor 1202, 1204, 1206 may be implemented as a virtual window. Each of the at least one monitor 1202, 1204, 1206 may be configured to display a given view outside of a vehicle. Each view may correspond to a field of view of the passenger 1212 looking at a given monitor as if the given monitor were a real vehicle window. The monitor 1202 may be implemented as a forward monitor. The monitor 1204 may be implemented as a middle monitor. The monitor 1206 may be implemented as an aft monitor.

Each of the at least one camera 1302, 1304, 1306, may be configured to capture video of the given view outside of the vehicle, where the given view may correspond to the field of view of the passenger looking at the given monitor as if the given monitor were the real vehicle window. In some embodiments, a quantity of the at least one camera 1302, 1304, 1306, may be equal to a quantity of the at least one virtual window monitor 1202, 1204, 1206.

At least one additional camera 1704 may be configured to capture video outside of the vehicle. Video from the at least one additional camera 1704 may be fed to the at least one computing device 1402.

In some embodiments, the current position (e.g., the first position or the second position) of the passenger 1212 may be determined by at least one sensor. The at least one sensor may include at least one sensor 1214 and/or at least one sensor 1216. For example, the at least one sensor 1216 may be implemented as a camera configured to sense a position of an eye or a head of the passenger 1212. For example, the at least one sensor 1214 may be implemented as a seat position sensor configured to detect a position of the seat 1208 that the passenger 1212 occupies.

The at least one computing device 1402 may include at least one processor 1404, at least one memory 1406, and at least one storage device, some or all of which may be communicatively coupled at any given time. The at least one processor 1404 may be configured to obtain sensor data from the at least one sensor 1214 and/or the at least one sensor 1216, to determine a current position of the passenger 1212 or a current eye or head position of the passenger 1212, and/or to switch the at least one switch 1310 from a first state to at least a second state based on the determined current position.

Additionally, in some embodiments, by executing software (e.g., the image editor software 1702) the at least one processor 1404 may be configured to: receive video from the at least one additional camera 1704; manipulate the video from each of the at least one additional camera 1704 based on a second position of the passenger 1212 to provide additional camera manipulated video stream(s), each of the additional camera manipulated video stream(s) corresponding to a field of view of the passenger 1212 looking at a given monitor of the at least one monitor 1202, 1204, 1206 when the passenger 1212 is in the second position; and output the additional camera manipulated video stream(s). For example, the at least one processor 1404 being configured to manipulate the video from the at least one additional camera 1704 may include the at least one processor 1404 being configured to at least one of: remove barrel distortion, edit the video based on horizontal and vertical field of view bounds so that the video field of view matches the passenger's field of view, or expand the edited video to fill an image area of a given monitor. For example, where an embodiment includes three cameras 1302, 1304, 1306, three monitors 1202, 1204, 1206, and a first additional camera 1704, the at least one processor 1404 may be configured to: receive video from the first additional camera 1704; manipulate the video from the first additional camera 1704 based on a second position of the passenger 1212 to provide first-, second-, and third-first additional camera manipulated video streams, each of the first-, second-, and third-first additional camera manipulated video streams corresponding to a field of view of the passenger 1212 looking at a given monitor of the three monitors 1202, 1204, 1206 when the passenger 1212 is in the second position; and output the first-, second-, and third-first additional camera manipulated video streams. For example, if a first additional camera 1704 is a wide-angle camera, the processor 1404 may be configured to manipulate video from the first additional camera 1704 to provide multiple (e.g., two, three, or more) video streams (e.g., first-, second-, and third-first additional camera manipulated video streams). Additionally, for example, where an embodiment includes three cameras 1302, 1304, 1306, three monitors 1202, 1204, 1206, and first, second, and third additional cameras 1704, the at least one processor 1404 may be configured to: receive video from the first, second, and third additional cameras 1704; manipulate the video from the first, second, and third additional cameras 1704 based on a second position of the passenger 1212 to provide a first additional camera manipulated video stream (e.g., a first-first additional camera manipulated video stream (i.e., a first video stream manipulated from video of a first additional camera 1704)), a second additional camera manipulated video stream (e.g., a first-second additional camera manipulated video stream (i.e., a first video stream manipulated from video of a second additional camera 1704)), and a third additional camera manipulated video stream (e.g., a first-third additional camera manipulated video stream (i.e., a first video stream manipulated from video of a third additional camera 1704)), each of the first, second, and third additional camera manipulated video streams corresponding to a field of view of the passenger 1212 looking at a given monitor of the three monitors 1202, 1204, 1206 when the passenger 1212 is in the second position; and output the first, second, and third additional camera manipulated video streams. Further, the at least one processor 1404 may be configured to perform any or all of the operations disclosed throughout. The at least one computing device 1402 may be implemented as any suitable computing device or any combination of suitable computing devices.

The at least one switch 1310 may be implemented as a single switch or multiple switches. For example, when the passenger 1212 is in the first position, the at least one switch 1310 may be configured to: feed video from the first camera 1302 to the first monitor 1202, feed video from the second camera 1304 to the second monitor 1204, and feed video from the third camera 1306 to the third monitor 1206. For example, when the passenger 1212 is in the second position, the at least one switch 1310 may be configured to: feed one of the additional camera manipulated video stream(s) to each of the at least one monitor 1202, 1204, 1206. For example, where an embodiment includes three cameras 1302, 1304, 1306, three monitors 1202, 1204, 1206, and a first additional camera 1704, the at least one switch 1310 may be configured to: when the passenger 1212 is in the second position, feed the first-first additional camera manipulated video stream to the first monitor 1202; when the passenger 1212 is in the second position, feed the second-first additional camera manipulated video stream to the second monitor 1204; and when the passenger 1212 is in the second position, feed the third-first additional camera manipulated video stream to the third monitor 1206. For example, where an embodiment includes three cameras 1302, 1304, 1306, three monitors 1202, 1204, 1206, and first, second, and third additional cameras 1704, the at least one switch 1310 may be configured to: when the passenger 1212 is in the second position, feed the first-first additional camera manipulated video stream to the first monitor 1202; when the passenger 1212 is in the second position, feed the first-second additional camera manipulated video stream to the second monitor 1204; and when the passenger 1212 is in the second position, feed the first-third additional camera manipulated video stream to the third monitor 1206.

Figure 18A:
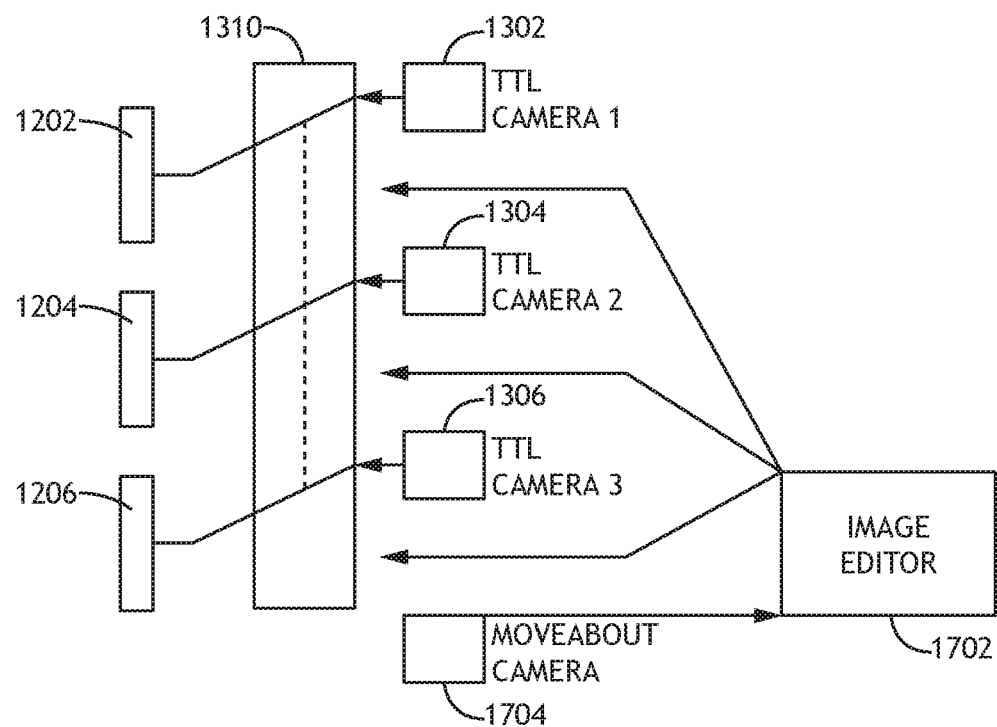
FIG. 18A depicts the at least one switch feeding video from the first camera to the first monitor, video from the second camera to the second monitor, and video from the third camera to the third monitor when the passenger is in the first position.
Figure 18B:
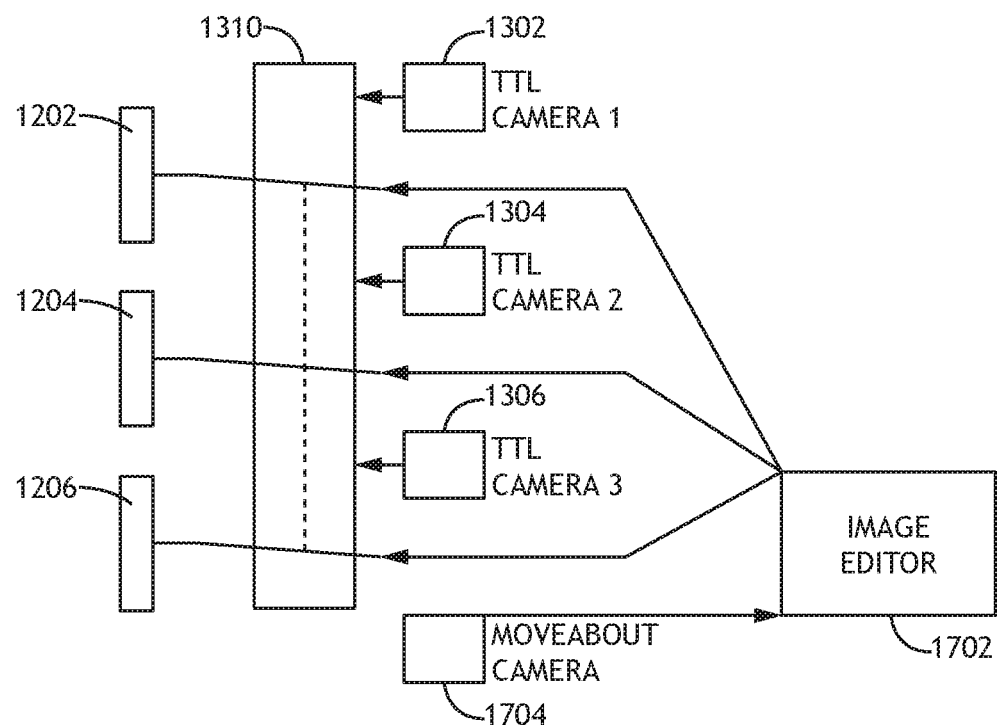
FIG. 18B depicts the at least one switch feeding feed one of the additional camera manipulated video stream(s) to each of the at least one monitor when the passenger is in the second position.

Referring now to FIGS. 18A-B, exemplary views of the at least one switch 1310, the at least one virtual window monitor 1202, 1204, 1206, the at least one camera 1302, 1304, 1306, 1308, and the at least one additional camera 1704 are depicted. FIG. 18A depicts the at least one switch 1310 feeding video from the first camera 1302 to the first monitor 1202, video from the second camera 1304 to the second monitor 1204, and video from the third camera 1306 to the third monitor 1206 when the passenger 1212 is in the first position (e.g., a TTL position). FIG. 18B depicts the at least one switch 1310 feeding feed one of the additional camera manipulated video stream(s) to each of the at least one monitor 1202, 1204, 1206 when the passenger 1212 is in the second position.

Figure 19A:
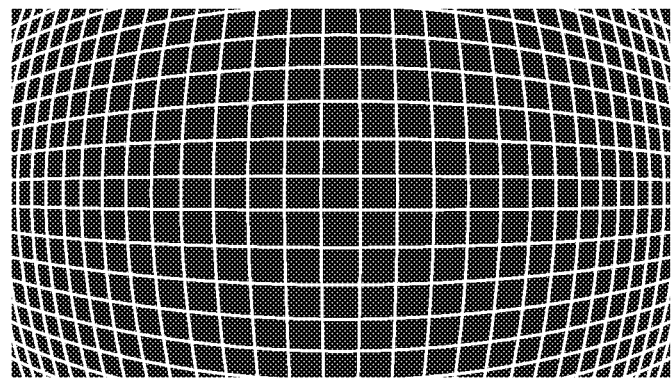
FIGS. 19A-D depict exemplary images illustrating operations carried out by execution of the image editor software.
Figure 19B:
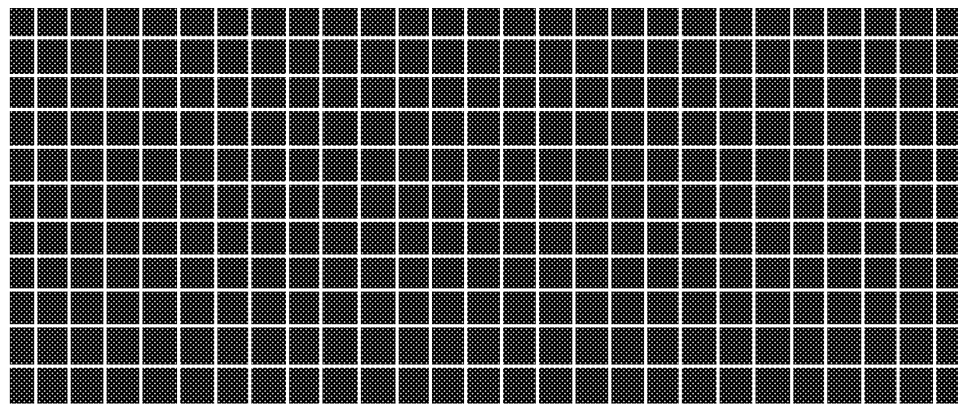
Figure 19C:
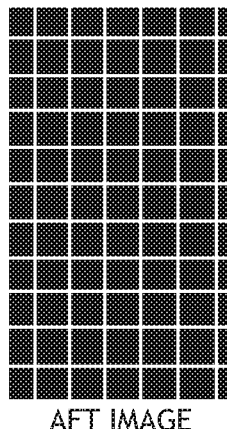
Figure 19C:
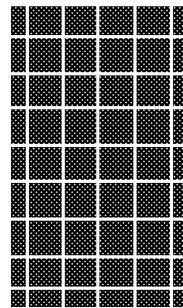
Figure 19C:
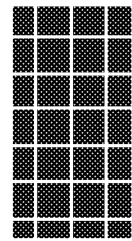
Figure 19D:
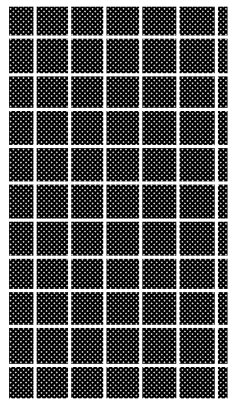
Figure 19D:
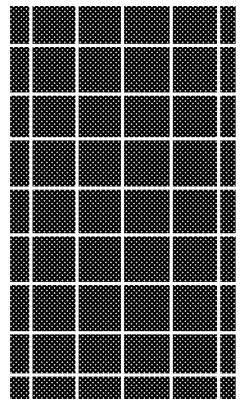
Figure 19D:
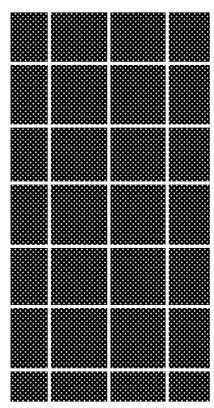

Referring now to FIGS. 19A-D, exemplary images illustrating operations carried out by execution of the image editor software 1702 are depicted. FIG. 19A shows typical barrel distortion found in raw images capturing a wide angular field of view. FIG. 19B shows removal of the barrel distortion from the raw image. The mathematics of removing barrel distortion are well known in the video field. FIG. 19C shows isolating the areas of the image bounded by the vertical field of view appropriate to the position of the viewer relative to the display and a corresponding horizontal field of view. Said vertical field of view bounds are calculated as a simple function of the downward viewing angle (D°) and the vertical angular field of view (V°). Said horizontal field of view bounds can be calculated as a simple function of the forward viewing angle (F°), the aspect ratio of the display and the vertical angular field of view (V°). As is seen in FIG. 19C, the image areas are progressively smaller moving from aft to forward in this example because the respective displays are farther from the viewer and, therefore, subtend a smaller angular field of view. FIG. 19D illustrates each isolated image area is expanded to fill the image area of the display.

Figure 20:
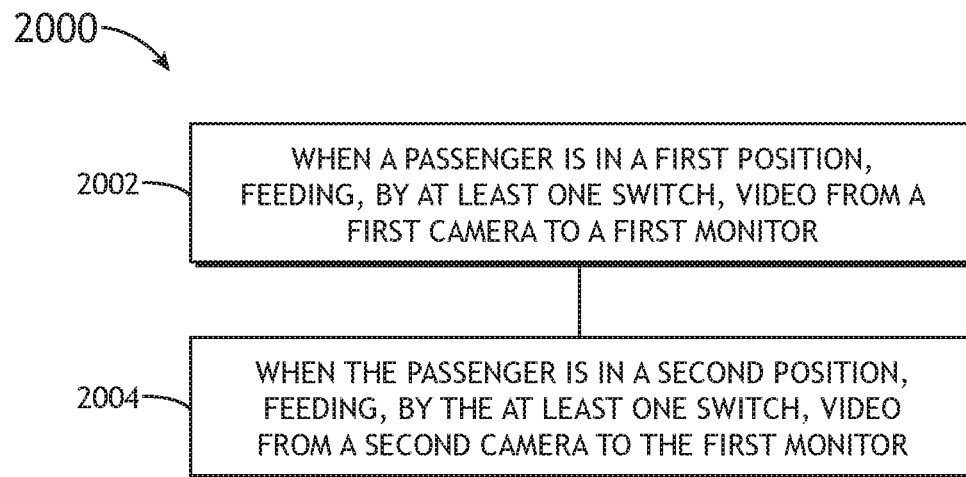
FIG. 20 depicts a flow diagram of an exemplary method.

Referring now to FIG. 20, an exemplary embodiment of a method 2000 according to the inventive concepts disclosed herein may include one or more of the following steps. Additionally, for example, some embodiments may include performing one more instances of the method 2000 iteratively, concurrently, and/or sequentially. Additionally, for example, at least some of the steps of the method 2000 may be performed in parallel and/or concurrently. Additionally, in some embodiments, at least some of the steps of the method 2000 may be performed non-sequentially.

A step 2002 may include when a passenger is in a first position, feeding, by at least one switch, video from a first camera to a first monitor.

A step 2004 may include when the passenger is in a second position, feeding, by the at least one switch, video from a second camera to the first monitor.

Further, the method may include any of the operations disclosed throughout.

Figure 21:
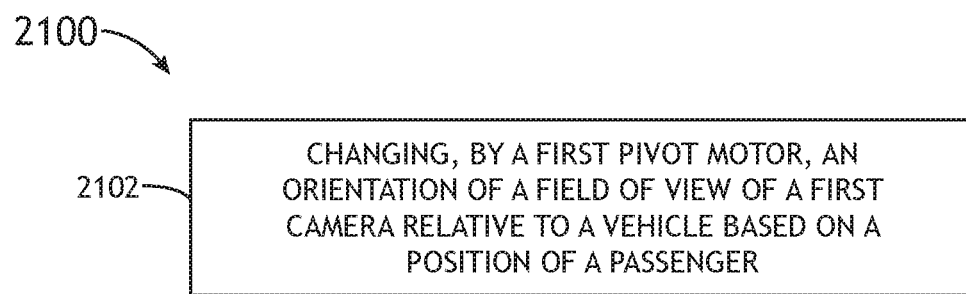
FIG. 21 depicts a flow diagram of an exemplary method.

Referring now to FIG. 21, an exemplary embodiment of a method 2100 according to the inventive concepts disclosed herein may include one or more of the following steps. Additionally, for example, some embodiments may include performing one more instances of the method 2100 iteratively, concurrently, and/or sequentially. Additionally, for example, at least some of the steps of the method 2100 may be performed in parallel and/or concurrently. Additionally, in some embodiments, at least some of the steps of the method 2100 may be performed non-sequentially.

A step 2102 may include changing, by a first pivot motor, an orientation of a field of view of a first camera relative to a vehicle based on a position of a passenger.

Further, the method may include any of the operations disclosed throughout.

Figure 22:
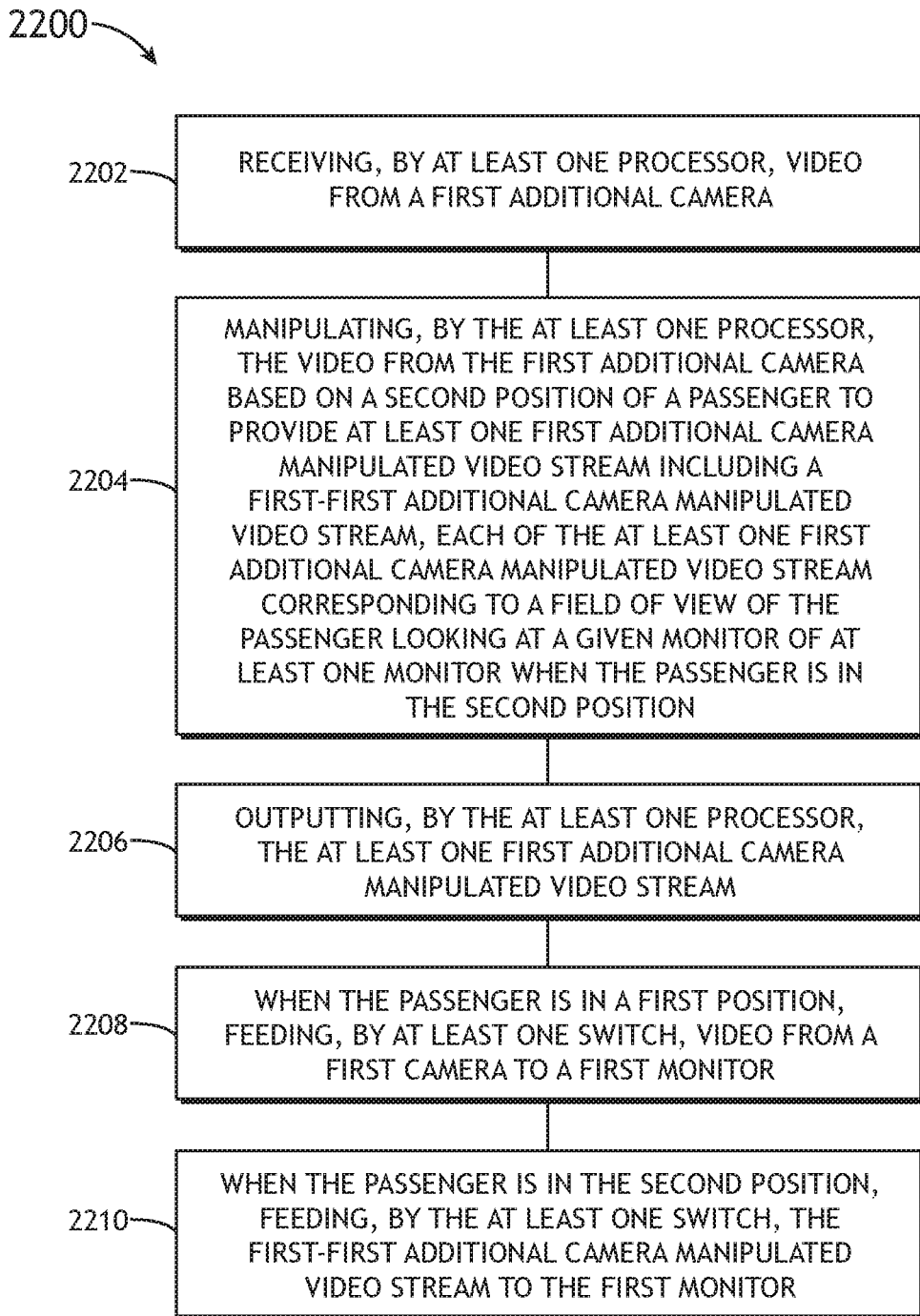
FIG. 22 depicts a flow diagram of an exemplary method.

Referring now to FIG. 22, an exemplary embodiment of a method 2200 according to the inventive concepts disclosed herein may include one or more of the following steps. Additionally, for example, some embodiments may include performing one more instances of the method 2200 iteratively, concurrently, and/or sequentially. Additionally, for example, at least some of the steps of the method 2200 may be performed in parallel and/or concurrently. Additionally, in some embodiments, at least some of the steps of the method 2200 may be performed non-sequentially.

A step 2202 may include receiving, by at least one processor, video from a first additional camera.

A step 2204 may include manipulating, by the at least one processor, the video from the first additional camera based on a second position of a passenger to provide at least one first additional camera manipulated video stream including a first-first additional camera manipulated video stream, each of the at least one first additional camera manipulated video stream corresponding to a field of view of the passenger looking at a given monitor of at least one monitor when the passenger is in the second position.

A step 2206 may include outputting, by the at least one processor, the at least one first additional camera manipulated video stream.

A step 2208 may include when the passenger is in a first position, feeding, by at least one switch, video from a first camera to a first monitor.

A step 2210 may include when the passenger is in the second position, feeding, by the at least one switch, the first-first additional camera manipulated video stream to the first monitor.

Further, the method may include any of the operations disclosed throughout.

As used throughout and as would be appreciated by those skilled in the art, "at least one non-transitory computer-readable medium" may refer to as at least one non-transitory computer-readable medium (e.g., memory 1406; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
    at least one monitor including a first monitor, each of the at least one monitor implemented as a virtual window, each of the at least one monitor configured to display a given view outside of a vehicle, each view corresponding to a field of view of a passenger looking at a given monitor as if the given monitor were a real vehicle window;
    at least two cameras including a first camera and a second camera, each of the at least two cameras configured to capture video of the given view outside of the vehicle, the given view corresponding to the field of view of the passenger looking at the given monitor as if the given monitor were the real vehicle window; and
    at least one switch, the at least one switch configured to:
        when the passenger is in a first position, directly feed video from the first camera to the first monitor with lower latency than non-directly fed video from the first camera to the first monitor; and
        when the passenger is in a second position, directly feed video from the second camera to the first monitor with lower latency than non-directly fed video from the second camera to the first monitor,
    wherein the at least one switch is a double channel, double throw switch or a triple channel, double throw switch,
    wherein the first position is a taxi, takeoff, and landing (TTL) position.

2. The system of claim 1, wherein the vehicle is an aircraft.

3. The system of claim 1, wherein a quantity of the at least two cameras is greater than a quantity of the at least one monitor.

4. The system of claim 1, wherein the at least two cameras comprises at least three cameras, wherein the at least one monitor comprises at least two monitors.

5. The system of claim 4, wherein the at least three cameras includes the first camera, the second camera, and a third camera, wherein the at least at least two monitors includes the first monitor and a second monitor, wherein the at least one switch is further configured to:
    when the passenger is in the first position, directly feed video from the first camera to the first monitor and directly feed video from the second camera to the second monitor; and
    when the passenger is in the second position, directly feed video from the second camera to the first monitor and directly feed video from the third camera to the second monitor.

6. The system of claim 5, wherein the at least one switch is the double channel, double throw switch.

7. The system of claim 1, wherein the at least two cameras comprises at least four cameras, wherein the at least one monitor comprises at least three monitors.

8. The system of claim 7, wherein the at least four cameras includes the first camera, the second camera, a third camera, and a fourth camera, wherein the at least at least three monitors includes the first monitor, a second monitor, and a third monitor, wherein the at least one switch is further configured to:
    when the passenger is in the first position, directly feed video from the first camera to the first monitor, directly feed video from the second camera to the second monitor, and directly feed video from the third camera to the third monitor; and
    when the passenger is in the second position, directly feed video from the second camera to the first monitor, directly feed video from the third camera to the second monitor, and directly feed video from the fourth camera to the third monitor.

9. The system of claim 8, wherein the at least one switch is the triple channel, double throw switch.

10. The system of claim 1, further comprising a sensor, wherein the first position and second position are determined by the sensor.

11. The system of claim 10, wherein the sensor is a camera.

12. The system of claim 11, wherein the sensor is configured to sense a position of an eye or a head of the passenger.

13. The system of claim 10, wherein the sensor is a seat position sensor configured to detect a position of a seat.

14. The system of claim 1, wherein the first position and second position are determined based on a position of a seat that the passenger occupies.

15. An aircraft system, comprising:
- at least one monitor including a first monitor, each of the at least one monitor implemented as a virtual window, each of the at least one monitor configured to display a given view outside of an aircraft, each view corresponding to a field of view of a passenger looking at a given monitor as if the given monitor were a real aircraft window;
- at least two cameras including a first camera and a second camera, each of the at least two cameras configured to capture video of the given view outside of the aircraft, the given view corresponding to the field of view of the passenger looking at the given monitor as if the given monitor were the real aircraft window; and
- at least one switch, the at least one switch configured to:
  - when the passenger is in a first position, directly feed video from the first camera to the first monitor with lower latency than non-directly fed video from the first camera to the first monitor; and
  - when the passenger is in a second position, directly feed video from the second camera to the first monitor with lower latency than non-directly fed video from the second camera to the first monitor,
- wherein the at least one switch is a double channel, double throw switch or a triple channel, double throw switch,
- wherein the first position is a taxi, takeoff, and landing (TTL) position.

16. The system of claim 15, wherein a quantity of the at least two cameras is greater than a quantity of the at least one monitor.

17. The system of claim 15, wherein the at least two cameras comprises at least three cameras, wherein the at least one monitor comprises at least two monitors.

18. The system of claim 17, wherein the at least three cameras includes the first camera, the second camera, and a third camera, wherein the at least at least two monitors includes the first monitor and a second monitor, wherein the at least one switch is further configured to:
- when the passenger is in the first position, directly feed video from the first camera to the first monitor and directly feed video from the second camera to the second monitor; and
- when the passenger is in the second position, directly feed video from the second camera to the first monitor and directly feed video from the third camera to the second monitor.

19. A method, comprising:
- when a passenger is in a first position, directly feeding, by at least one switch, video from a first camera to a first monitor with lower latency than non-directly fed video from the first camera to the first monitor; and
- when the passenger is in a second position, directly feeding, by the at least one switch, video from a second camera to the first monitor with lower latency than non-directly fed video from the second camera to the first monitor,
- wherein at least one monitor includes the first monitor, each of the at least one monitor implemented as a virtual window, each of the at least one monitor configured to display a given view outside of a vehicle, each view corresponding to a field of view of the passenger looking at a given monitor as if the given monitor were a real vehicle window,
- wherein at least two cameras include the first camera and the second camera, each of the at least two cameras configured to capture video of the given view outside of the vehicle, the given view corresponding to the field of view of the passenger looking at the given monitor as if the given monitor were the real vehicle window,
- wherein the at least one switch is a double channel, double throw switch or a triple channel, double throw switch,
- wherein the first position is a taxi, takeoff, and landing (TTL) position.

* * * * *